United States Patent
Jain et al.

(10) Patent No.: US 12,453,518 B2
(45) Date of Patent: Oct. 28, 2025

(54) APPARATUS AND METHOD FOR VALIDATING LABELED DATA GENERATED BY A PREDICTION GENERATOR

(71) Applicant: Anumana, Inc., Cambridge, MA (US)

(72) Inventors: Rohit Jain, Danville, CA (US); Anand Ramani, Fresno, CA (US); Kappagantula Gopalakrishna Murty, Nanaimo (CA); Yogisha H J, Bengaluru (IN); Sanjeev Shrinivas Nadapurohit, Thane (IN); Karthik K. Bharadwaj, Bengaluru (IN); Leon Ptaszek, Boston, MA (US)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/973,037

(22) Filed: Dec. 8, 2024

(65) Prior Publication Data
US 2025/0204863 A1 Jun. 26, 2025

Related U.S. Application Data

(60) Provisional application No. 63/614,870, filed on Dec. 26, 2023.

(51) Int. Cl.
*A61B 5/00* (2006.01)
*A61B 5/318* (2021.01)

(52) U.S. Cl.
CPC ........... *A61B 5/7221* (2013.01); *A61B 5/318* (2021.01); *A61B 5/7267* (2013.01)

(58) Field of Classification Search
None
See application file for complete search history.

(56) References Cited

U.S. PATENT DOCUMENTS

| 11,366,988 B2 | 6/2022 | Khan et al. |
| 2009/0076340 A1* | 3/2009 | Libbus ............ A61B 5/11 600/509 |

(Continued)

FOREIGN PATENT DOCUMENTS

CN 114334100 A 4/2022

OTHER PUBLICATIONS

Baur, Christoph, Shadi Albarqouni, Stefanie Demirci, Nassir Navab, and Pascal Fallavollita. "Cathnets: detection and single-view depth prediction of catheter electrodes." In Medical Imaging and Augmented Reality: 7th Int'l Conf., MIAR 2016, Bern, Switzerland, Aug. 24-26, 2016. pp. 38-49. (Year: 2016).*

(Continued)

*Primary Examiner* — Vincent Gonzales
(74) *Attorney, Agent, or Firm* — Caldwell Intellectual Property Law

(57) ABSTRACT

An apparatus and method for validating, using user input, labeled data generated by a prediction generator. The apparatus includes at least a processor and a memory communicatively connected to the at least a processor. The processor receives at least a potential signal, generates processed data using the at least a potential signal, trains a prediction generator on a plurality of labeled training data, wherein the plurality of labeled training data comprises the processed data associated with at least an annotation, generates, using the prediction generator, a plurality of labeled data as a function of dynamic data, displays the plurality of labeled data to a user interface of a graphical user interface, receives a user input associated with the plurality of labeled data, and retrains the prediction generator using the user input.

16 Claims, 13 Drawing Sheets

(56) References Cited

U.S. PATENT DOCUMENTS

| | | | |
|---|---|---|---|
| 2016/0081566 A1* | 3/2016 | Xu | A61B 5/316 |
| | | | 600/509 |
| 2021/0073528 A1* | 3/2021 | Lagerman | G06V 40/10 |
| 2021/0125004 A1 | 4/2021 | Robert | |
| 2021/0259778 A1* | 8/2021 | Newton | A61B 5/7203 |
| 2024/0203101 A1 | 6/2024 | Zhang et al. | |

OTHER PUBLICATIONS

Pasolli, Edoardo, and Farid Melgani. "Active learning methods for electrocardiogramal classification." IEEE Trans. on Info. Tech. in Biomedicine 14, No. 6 (2010): 1405-16.) (Year: 2010).*
Wu, Hao, and Saurabh Prasad. "Semi-supervised deep learning using pseudo labels for hyperspectral image classification." IEEE Transactions on Image Processing 27, No. 3 (2017): 1259-1270. (Year: 2017).*

* cited by examiner

APPARATUS AND METHOD FOR VALIDATING LABELED DATA GENERATED BY A PREDICTION GENERATOR

CROSS-REFERENCE TO RELATED APPLICATIONS

This application claims the benefit of priority of U.S. Provisional Patent Application Ser. No. 63/614,870, filed on Dec. 26, 2023, and titled "SEMI-SUPERVISED MACHINE LEARNING MODEL," which is incorporated by reference herein in its entirety.

FIELD OF THE INVENTION

The present invention generally relates to the field of machine learning. In particular, the present invention is directed to an apparatus and a method for validating, using user input, labeled data generated by a prediction generator.

BACKGROUND

With recent advancements in healthcare industry, machine learning has played a crucial part in signal processing. Machine learning has proven to be particularly helpful in scenarios where clinical decision-making requires rapid, integrative assessments of high volumes of data or comparison of data from multiple categories.

SUMMARY OF THE DISCLOSURE

In an aspect, an apparatus for validating, using user input, labeled data generated by a prediction generator includes at least a processor and a memory communicatively connected to the at least a processor. The memory contains instructions configuring the processor to receive at least a potential signal, wherein the at least a potential signal corresponds to temporal data, generate, using the at least a processor, processed data using the at least a potential signal, train a prediction generator on a plurality of labeled training data, wherein the plurality of labeled training data comprises the processed data associated with at least an annotation, generate, using the prediction generator, a plurality of labeled data as a function of dynamic data, display, using a downstream device, the plurality of labeled data to a user interface of a graphical user interface, receive a user input associated with the plurality of labeled data, retrain the prediction generator using the user input.

In another aspect, a method for validating, using user input, labeled data generated by a prediction generator includes receiving at least a potential signal, wherein the at least a potential signal corresponds to temporal data, generating, using the at least a processor, processed data using the at least a potential signal, training a prediction generator on a plurality of labeled training data, wherein the plurality of labeled training data comprises the processed data associated with at least an annotation, generating, using the prediction generator, a plurality of labeled data as a function of dynamic data, displaying, using a downstream device, the plurality of labeled data to a user interface of a graphical user interface, receiving a user input associated with the plurality of labeled data, retraining the prediction generator using the user input.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for validating, using user input, labeled data generated by a prediction generator. The apparatus includes at least a computing device comprised of a processor and a memory communicatively connected to the processor. The memory instructs the processor to receive at least a potential signal, wherein the at least a potential signal corresponds to temporal data. The processor generates, using the at least a processor, processed data using the at least a potential signal. The processor trains a prediction generator on a plurality of labeled training data, wherein the labeled data comprises the processed data associated with at least an annotation. Additionally, the processor generates, using the prediction generator, a plurality of labeled data as a function of dynamic data. The processor displays, using a downstream device, the plurality of labeled data to a user interface of a graphical user interface. The memory then instructs the processor to receive a user input associated with the plurality of labeled data. The processor retrains the prediction generator using the user input.

Figure 1:
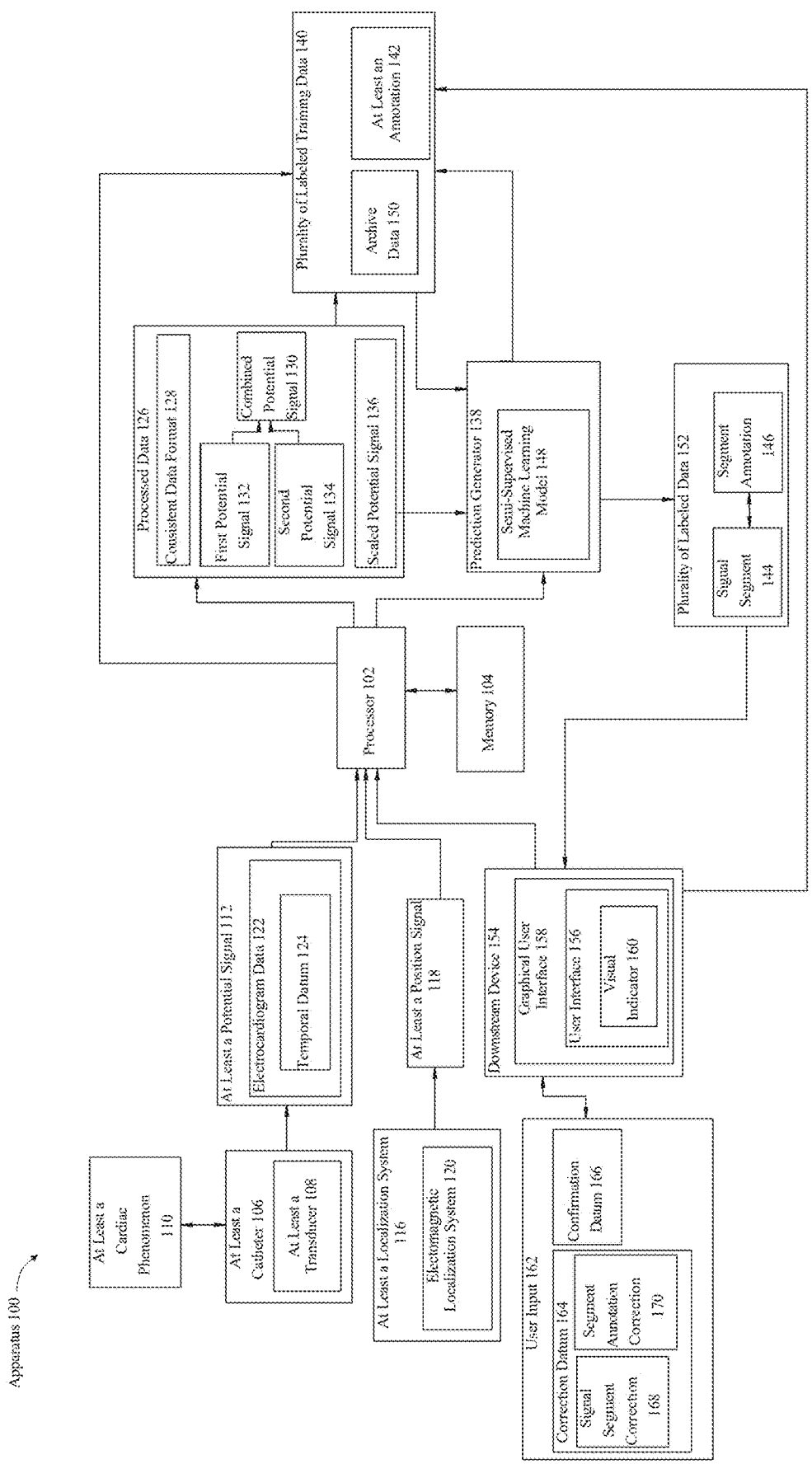
FIG. 1 is a block diagram of an apparatus for validating, using user input, labeled data generated by a prediction generator.

Referring now to FIG. 1, an exemplary embodiment of apparatus 100 for validating, using user input, labeled data generated by a prediction generator is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 includes at least a catheter 106 configured for intracardiac use, at least a catheter 106 comprising at least a transducer 108 configured to detect at least a cardiac phenomenon 110 and output at least a potential signal 112, as a function of cardiac phenomenon 110. As used in this disclosure, a "catheter" is a flexible tube inserted into the body to perform various medical procedures. In a non-limiting example, at least a catheter 106 may record and map at least a beat of cardiac phenomenon 110 and output at least a visual element. In a non-limiting example, at least a catheter 106 may be used to facilitate the detection and mapping of cardiac activity, providing essential data for apparatus 100 to process and analyze. In a non-limiting example, at least a catheter 106 may be used in procedures such as cardiac ablation or electrophysiological studies to gather detailed information about heart rhythms. As used in this disclosure, a "cardiac phenomenon" is any physiological or pathological event, activity, or condition related to the function or behavior of the heart that can be detected or measured. Cardiac phenomenon 110 includes but is not limited to electrical signals, mechanical movements, pressure changes, and biochemical processes occurring within the heart or its surrounding tissues. Cardiac phenomenon 110 are crucial indicators of heart health and function, and they provide valuable data for diagnosing, monitoring, and treating various cardiac conditions. In a non-limiting example, cardiac phenomenon 110 may refer to the electrical activity associated with the heart's rhythm, such as the depolarization and repolarization of cardiac cells that create the P wave, QRS complex, and T wave observed in an electrocardiogram (ECG). Transducer 108 in at least a catheter 106 may detect these electrical signals and output potential signals corresponding to these cardiac events, enabling real-time monitoring of heart rhythms and the identification of arrhythmias or other electrical abnormalities.

As used in this disclosure, a "transducer" is a device designed to convert one form of energy into another. In a non-limiting example, transducer 108 may facilitate the measurement, monitoring, and control of various physical quantities. Without limitation, this energy conversion capability may enable transducers to be used for various applications. For instance, without limitation, transducers may be used in ultrasound equipment to transform electrical energy into sound waves and vice versa, creating images of internal body structures. When a transducer converts a quantity of energy to an electrical voltage or an electrical current it is called a sensor. A measurable quantity of energy may include sound pressure, optical intensity, magnetic field intensity, thermal pressure, etc. When a transducer converts an electrical signal into another form of energy such as sound, light, mechanical movement, it is called an actuator. It should be noted that sound is incidentally a pressure field. Actuators allow the use of feedback at the source of the measurements. In a non-limiting embodiment, a transducer may detect at least a cardiac phenomenon 110 and output potential signal. In another non-limiting example, a transducer may include a plurality of clinical transducers. As used in this disclosure, a "plurality of clinical transducers" is a transducer device used in the medical field to measure, analyze, and/or quantify electrical signals in a body. As used in this disclosure, a "potential signal" is the electrical signal generated and output by a transducer in response to detecting cardiac phenomenon 110 within the heart. The potential signal may be indicative of the heart's electrical activity, which may be used for diagnostic or monitoring purposes. The potential signal may represent variations in electrical potential that occur as the heart undergoes its rhythmic contractions and relaxations, providing valuable data on the cardiac cycle and function. In a non-limiting example, potential signal 112 may be generated by transducer 108 embedded in at least a catheter 106 during an electrophysiological study. When at least a catheter 106 is positioned intracardially, transducer 108 may detect electrical impulses corresponding to the depolarization and repolarization phases of the cardiac cycle. The output potential signal may then be transmitted to an external monitoring system where it is displayed as an electrocardiogram (ECG) tracing. Continuing, the tracing may allow cardiologists to analyze the electrical activity and identify abnormalities such as arrhythmias or conduction blockages. In another non-limiting example, the potential signal may be used in a real-time cardiac monitoring system during a surgical procedure. Continuing, as at least a catheter 106 transducer may detect changes in intracardiac electrical activity, the potential signal is continuously sent to a monitoring device. Without limitation, surgeons may use this real-time data to make informed decisions about interventions, ensuring that the heart remains stable and functions properly throughout given procedure. Without limitation, the aforementioned application highlights the versatility of potential signals in providing critical, time-sensitive information in various medical contexts.

In another non-limiting example, cardiac phenomenon 110 may include the mechanical contraction and relaxation of the heart muscle, such as the pressure changes during the systolic and diastolic phases of the cardiac cycle. Transducer 108 may detect variations in intracardiac pressure and generate signals that reflect these pressure changes. This data may be used to assess cardiac output, diagnose conditions like heart failure or valvular heart disease, and guide therapeutic interventions by providing detailed insights into the heart's mechanical function.

This may include, without limitation, various types of signal data, such as analog signals, digital signals, time-series signal data, spatial signals, frequency signals, multi-dimensional signals, and the like. In a non-limiting example, an analog signal is any continuous-time signal representing some other quantity, i.e., analogous to another quantity. For example, and without limitation, in an analog audio signal, the instantaneous signal voltage varies continuously with the pressure of the sound waves. Typically, analog signal refers to electrical signals; however, mechanical, pneumatic, hydraulic, and other systems may also convey or be considered analog signals. In another non-limiting example, a digital signal is a signal that represents data as a sequence of discrete values; at any given time it can only take on, at most, one of a finite number of values. In some cases, digital signals may represent information in discrete bands of analog levels, wherein all levels within a band of values represent the same information state. In a non-limiting example, a digital signal may be represented as a digital circuit. Typically, digital circuit signals can have two possible valid values; a binary signal or logic signal wherein the binary signal and the logic signal are represented by two voltage bands: one voltage band that is near a reference value, and the other voltage value that is near the supply voltage. The voltage bands correspond to the two values "zero" and "one" (or "false" and "true") of the Boolean domain, wherein at any given time, a binary signal represents one binary digit (bit). Without limitation, digital signals are generally used for communications and processing within electronic devices and computer systems. In another non-limiting example, time-series signal data is information in the form of a signal that is collected and recorded over consistent intervals of time. Without limitation, time-series signal data may be used in order to extract meaningful statistics and other characteristics of the data. Time-series signal data can be classified into two main types: continuous-time series signals and discrete-time signals. Continuous-time signals are signals that are measured and recorded over a continuous range, including, but not limited to, analog signals, such as sound waves and temperature measurements (from analog devices like analog thermometers). On the other hand, discrete-time signals are recorded at specific, distinct points. For example, and without limitation, discrete-time signals may include digital sensor measurements and financial market data sampled at fixed intervals. In another non-limiting example, potential signal 112 may include an electrocardiogram signal wherein the electrocardiogram signal may include an electrocardiogram datum. As used herein, an "electrocardiogram datum" is a single data point obtained from the electrical activity of the heart of a patient. An electrocardiogram datum may be derived from an electrocardiogram signal. In some embodiments, an electrocardiogram datum may include a rhythm strip electrocardiogram datum. As used herein, a "rhythm strip electrocardiogram datum" is a datum describing electrical activity detected using a single electrode. In some embodiments, an electrocardiogram datum may include a median beat electrocardiogram datum. As used herein, a "median beat electrocardiogram datum" is a datum describing electrical activity detected using a plurality of leads and/or electrodes. In some embodiments, an electrocardiogram datum may include data collected by 2, 3, 4, 5, 6, 7, 8, 9, 10, 11, 12, or more electrocardiogram leads. For example, an electrocardiogram datum may include a median beat collected by 12 electrocardiogram leads. A "lead," as used in this disclosure, is one or more electrodes attached to the skin to detect a heart's electric signals. As used in this disclosure, a "standard 12-lead electrocardiogram signal" is a measurement the electrical activity of a heart from 12 different perspectives. In a non-limiting embodiment a standard 12-lead electrocardiogram signal may include a graphical record of the direction and magnitude of the electrical activity generated by the depolarization and repolarization of the atria and ventricles of the heart. As used in this disclosure, an "electroanatomic map" is a detailed, three-dimensional representation of the electrical activity and anatomical structure of the heart. In a non-limiting example, the electroanatomic map may be created using data collected from a catheter that records and maps cardiac phenomena. In another non-limiting example, the electroanatomic map may provide a visual depiction of the heart's electrical impulses and physical form, enabling precise identification and analysis of areas that may be causing abnormal heart rhythms or other cardiac issues. The electroanatomic map integrates both the electrical signals and the spatial geometry of the heart, offering a comprehensive tool for diagnosis and treatment planning. In a non-limiting example, an electroanatomic map may be created during an electrophysiological study where a catheter is navigated through the heart to record electrical activity. The data collected from various points within the heart is used to construct a three-dimensional map that highlights regions of interest, such as areas with abnormal electrical pathways or scar tissue. This map can be displayed on a monitor, providing clinicians with a visual guide to target specific areas for ablation therapy, thereby improving the precision and effectiveness of the treatment. In another non-limiting example, the electroanatomic map may be employed during a cardiac procedure to continuously update the map in real-time as at least a catheter 106 moves within the heart. This dynamic mapping allows for immediate adjustments based on the current electrical activity and anatomical changes observed during the procedure. Such real-time updates may be particularly useful in complex cases where the anatomy and electrical activity of the heart vary significantly from patient to patient, ensuring that the intervention is tailored to the individual's specific cardiac structure and function.

Still referring to FIG. 1, apparatus 100 includes at least a localization system 116 configured to detect at least a position signal 118 as a function of a location of at least a catheter. As used in this disclosure, a "localization system" is a specialized apparatus designed to detect and determine the position of a catheter within a body or environment by utilizing position signal 118. These signals are a function of at least a catheter 106 location, enabling precise tracking and navigation during medical procedures. In a non-limiting example, the purpose of at least a localization system 116 is to enhance the safety and efficacy of catheter-based interventions by providing critical spatial information. As used in this disclosure, a "position signal" is a signal generated by localization system 116 to determine the location of a catheter within the body. With continued reference to FIG. 1, in a non-limiting example, localization system 116 may be consistent with one or more aspects of the localization system described, U.S. patent application Ser. No. 18/764,853, filed on Jul. 5, 2024, titled "SYSTEM AND METHOD FOR LOCATING A MEDICAL DEVICE USING AN ELECTRICAL FIELD CREATION," which is incorporated by reference herein in its entirety.

With continued reference to FIG. 1, at least a localization system 116 may include an electromagnetic localization system 120. Additionally and or alternatively, at least a localization system 116 may include an ultrasound-based localization system, an optical localization system, and an impedance-based localization system. As used in this disclosure, an "electromagnetic localization system" is a type of localization technology that uses electromagnetic fields to determine the precise position and orientation of objects within a given space. This system typically involves generating a low-frequency electromagnetic field in the area of interest, and then tracking the position of sensors or coils that respond to this field. The sensors may be integrated into catheters or other medical instruments, allowing for accurate real-time tracking of their location and movement within the body. In the context of electroanatomic mapping, the electromagnetic localization system 120 enables the precise localization of at least a catheter 106 tip within the heart. This is achieved by placing electromagnetic field generators around the patient and using sensors on at least a catheter 106 to detect the field. The system calculates the exact position and orientation of at least a catheter 106 by measuring the electromagnetic field's strength and direction at the sensor's location. This information is then transmitted to the processor, which uses it to construct a detailed, three-dimensional map of the heart's anatomy. This technology is essential for guiding medical procedures such as catheter ablation, where precise navigation within the heart is critical. By providing accurate and real-time positional data, the electromagnetic localization system 120 ensures that at least a catheter 106 can be maneuvered safely and effectively to target areas of abnormal electrical activity, thereby improving the outcomes of the procedure.

With continued reference to FIG. 1, as used in this disclosure, an "ultrasound-based localization system" is a method used to determine the position and movement of objects within the body by employing high-frequency sound waves. The ultrasound-based localization system may involve the use of an ultrasound transducer that emits sound waves, which then reflect off internal structures and are captured by transducer 108 or other sensors. Continuing, the reflected sound waves are processed to create real-time images or data points that represent the location and motion of the tracked object, such as a catheter or other medical instruments. The ultrasound-based localization system may be particularly useful in medical procedures because it provides real-time, non-invasive visualization of internal body structures. The ultrasound-based localization system may allow clinicians to guide instruments accurately within the body, enhancing the precision and safety of procedures like catheter ablation, biopsies, or other interventions. This technology is often integrated with other systems to provide comprehensive spatial and functional mapping of the area being treated. For example, at least a localization system 116 may utilize ultrasound technology, where an array of ultrasound transducers is positioned around the patient. At least a catheter 106, may be fitted with miniature ultrasound receivers, detects the emitted ultrasound waves. At least a localization system 116 may calculate at least a catheter 106 position based on the time it takes for the ultrasound waves to reach the receivers, allowing for precise localization of at least a catheter 106 tip during a procedure.

With continued reference to FIG. 1, as used in this disclosure, "optical localization system" is a method of determining the position and movement of objects using light, typically through the use of cameras and other optical sensors. Optical localization system technology may capture visual data from the tracked object and processes this information to calculate its precise location and trajectory in real-time. In an optical localization system, reflective markers or LED lights may be attached to the object being tracked, such as a catheter tip. Cameras positioned around the area capture the light reflected or emitted by these markers, and software algorithms analyze the captured images to triangulate the exact position of the markers. This data is then transmitted to the processor, which integrates it with other signals to create a comprehensive map of the object's movement within the heart. This method is highly accurate and provides detailed spatial information, making it particularly useful in medical applications where precise positioning is crucial. Optical localization system can be used in conjunction with other localization methods to enhance the overall accuracy and reliability of the electroanatomic mapping system.

With continued reference to FIG. 1, as used in this disclosure, "impedance-based localization system" is a technique used to determine the position of a catheter or other medical device within the body by measuring the electrical impedance between the device and electrodes placed on the patient's body. This method involves passing a small, alternating current through the body and measuring the resulting voltage at different points, allowing the system to calculate the impedance. At least a localization system 116 can then use these impedance measurements to triangulate the exact position of at least a catheter 106 tip within the heart or other body cavities. Impedance varies with the distance and the type of tissue between at least a catheter 106 and the electrodes, enabling precise tracking of the device's location. This technique is particularly useful in electroanatomic mapping and other procedures requiring accurate real-time positioning of medical instruments within the body. In a non-limiting example, position signal 118 may be generated using electromagnetic fields, ultrasound, or other tracking technologies to provide real-time spatial information about at least a catheter 106 position. In a non-limiting example, apparatus 100 may employ other tracking technologies, such as optical localization system or impedance-based localization, to generate position signal 118. Optical localization system uses cameras and reflective markers on at least a catheter 106 to capture its movement and position, while impedance-based localization measures electrical impedance differences between at least a catheter 106 and the body tissues. These methods provide accurate real-time spatial information that processor 102 uses alongside potential signal 112.

Still referring to FIG. 1, processor 102 is configured to receive at least a potential signal 112 from at least a transducer 108 and at least a position signal 118 from at least a localization system 116. In a non-limiting example, processor 102 may utilize an electrocardiogram (ECG) transducer to capture electrical signals from the heart, which may be indicative of the cardiac cycle. The ECG transducer may detect the electrical potentials generated by the heart's activity and transmits these signals to processor 102. Processor 102 may then analyze the amplitude and frequency of these signals to identify specific heartbeats, allowing for precise timing and coordination with the electroanatomic mapping system. In a non-limiting example, at least a localization system 116 may use a magnetic or electromagnetic field to determine the exact position of a catheter tip within the heart. At least a localization system 116 may generate position signals wherein processor 102 may be configured to receive position signal 118. Continuing, position signal 118 may be used to create a three-dimensional map of the heart's anatomy, showing the real-time position of at least a catheter 106. Without limitation, the position data with potential signal 112 may be combined and processor 102 may map the electrical activity across different regions of the heart, enhancing the accuracy of the electroanatomic mapping. In a non-limiting example, processor 102 may employ advanced algorithms to filter and interpret potential signal 112 received from multiple transducers placed at various points on the patient's body. Continuing, the algorithms may differentiate between true cardiac signals and noise or artifacts, ensuring that only relevant electrical activity is used for mapping. Processor 102 may integrate the filtered data with the positional information from localization system. In a non-limiting example, this integration may allow clinicians to visualize the propagation of electrical impulses through the heart's chambers and identify areas of abnormal conduction.

With continued reference to FIG. 1, at least a potential signal 112 may include plurality of electrocardiogram data 122. As used in the current disclosure, a "electrocardiogram data" is a signal representative of electrical activity of heart. Electrocardiogram data 122 may consist of several distinct waves and intervals, each representing a different phase of the cardiac cycle. These waves may include the P-wave, QRS complex, T wave, U wave, and the like. The P-wave may represent atrial depolarization (contraction) as the electrical impulse spreads through the atria. The QRS complex may represent ventricular depolarization (contraction) as the electrical impulse spreads through the ventricles. The QRS complex may include three waves: Q wave, R wave, and S wave. The T-wave may represent ventricular repolarization (recovery) as the ventricles prepare for the next contraction. The U-wave may sometimes be present after the T wave, it represents repolarization of the Purkinje fibers. The intervals between these waves may provide information about the duration and regularity of various phases of the cardiac cycle.

Still referring to FIG. 1, processor 102 is configured to receive at least a potential signal 112, wherein at least a potential signal 112 corresponds to temporal datum 124. As used in this disclosure, "temporal data" is data that includes a timestamp or time-related information, indicating when an event occurred or a measurement was taken. In a non-limiting example, temporal data 124 may include the exact timestamp at which an electrocardiogram (ECG) reading was recorded, indicating when each heartbeat occurred during the monitoring period. Without limitation, temporal data 124 may include a plurality of temporal datums, wherein each temporal datum may include a timestamp associated with a heartbeat. In a non-limiting example, temporal data 124 may help users identify irregularities, and diagnose conditions like arrhythmias. Without limitation, temporal data 124 sequence of heartbeats may provide organized information to detect patterns that might indicate underlying cardiac conditions.

Still referring to FIG. 1, processor 102 is configured to generate processed data 126 using at least a potential signal 112. As used in this disclosure, "processed data" is data that has been cleaned, transformed, and organized to be useful for analysis, decision-making, or further processing. In a non-limiting example, processed data 126 may be used at input into the prediction generator as discussed in more detail below. In another non-limiting example, processed data 126 may be used as training data as discussed in more detail below. Without limitation, processor 102 may be configured to generate processed data 126 by normalizing the potential signal into consistent data format 128, generating combined potential signal 130 by combining first potential signal 132 with second potential signal 134 of at least a potential signal 112, wherein first potential signal 132 is a duplicate of second potential signal 134, and generating scaled potential signal 136 of at least a potential signal 112. As used in this disclosure, a "consistent format" is a standardized way of presenting and organizing data or information such that it adheres to a specific set of rules or guidelines. As used in this disclosure, a "combined potential signal" is a single piece of data that integrates multiple types of data or information from various sources into a unified, cohesive entity.

In a non-limiting example, at least a potential signal 112 may be raw ECG data which may include a plurality of data points corresponding to a timestamp "2024 Jul. 18 10:00:00" and a voltage "0.89 mV." Continuing, at least a potential signal 112 may be processed by converting all timestamps to a common time zone, such as coordinate universal time (UTC) and a consistent format, for example, ISO 8601. As used in this disclosure, "ISO 8601" is an international standard for date and time representations issued by the International Organization for Standardization (ISO). For example, without limitation, an ISO 8601 format for time may include a basic format "hhmmss, i.e., 135730 for 1:57:30 PM" ad/or it may include extended format "hh:mm, i.e., 13:57:30 for 1:57:30 PM."

Additionally and or alternatively, a low-pass filter to remove high-frequency noise from the voltage readings may be applied to at least a potential signal 112. For example, a low pass filter applied to ECG data may provide isolation of relevant signals, such as the heartbeats, from unwanted noise. Without limitation, by applying a low-pass filter, at least a potential signal 112 may be cleaned and made more reliable for further analysis. Continuing, this preprocessing step ensures that the subsequent analyses are based on accurate and clean data, thus may improve the validity of the results.

In another non-limiting example, at least a potential signal 112 may be resampled to a consistent time interval. For example, without limitation, at least a potential signal 112 may be sampled every second or every 0.5 of a second. In another non-limiting example, the voltage readings may be set to a standard scale, such as 0 to 1 or −1 to 1. Without limitation resampling may help in standardizing the data points, making them uniformly spaced over time. Continuing, resampling may be useful when processing signal data collected at irregular intervals and may help ensure that all data points are aligned and comparable.

In another non-limiting example, at least a potential signal 112 may include identifying and removing outlier data points that deviate significantly from the expected range. For example, outliers in ECG data may result from various sources, such as sensor malfunctions or sudden movements by the subject. Identifying and removing these outliers is crucial for ensuring the accuracy and reliability of the data. Continuing, this process may involve utilizing statistical techniques, like Z-score analysis, and interquartile range method (IQR), and the like, to detect abnormal values and either correct or discard them. Without limitation, Z-score analysis is a statistical technique that measures the number of standard deviations a data point is from the mean of the dataset. Without limitation, IQR is based on the spread of the middle 50% of the data and determining upper and lower bounds to filter data through. Detecting outliers may be essential for maintaining the integrity of the dataset and ensuring that the conclusions drawn from the signal analysis are accurate and reliable.

Still referring to FIG. 1, prediction generator 138 is trained on plurality of labeled training data 140, wherein plurality of labeled training data 140 comprises archive data 150 associated with at least an annotation 142. As used in this disclosure, "labeled training data" is data used to train a machine learning model. In a non-limiting example, labeled training data 140 may include datasets in which each data point is annotated with a corresponding label that identifies the category or value it represents. For instance, without limitation, labeled training data 140 may include segments of the cardiac signal annotated with labels such as "Normal Sinus Rhythm," "AFib," "PVC," and "STEMI," each indicating a specific type of cardiac event or condition. Continuing, this labeling process may enable the machine learning models to understand the relationship between the input data and the expected output, facilitating accurate pattern recognition and prediction. In a non-limiting example, the generation of labeled training data 140 may involve several steps, including data collection, preprocessing, and annotation. For example, without limitation, the data collection phase may involve gathering raw data from various sources, such as medical devices, sensors, or other relevant inputs. Continuing, preprocessing the data may ensure it is in a consistent format, free of noise and artifacts, and ready for analysis. Continuing, annotation, may be performed by experts in the field, where the expert reviews the data and assigns appropriate labels based on predefined criteria. In some cases, without limitation, automated tools or algorithms may assist in the initial labeling process, with human experts refining the labels to ensure accuracy. Continuing, without limitation, the combination of human expertise and automated assistance may provide a high-quality labeled datasets essential for training robust machine learning models.

With continued reference to FIG. 1, as used in this disclosure, "archive data 150" is data that is collected and analyzed after the events it represents have occurred. For example, without limitation, archive data 150 may be raw ECG data that is stored in a database. Continuing, this raw data may include unprocessed electrical signals recorded from the heart over a given period, providing a complete, unaltered record of the cardiac activity at the time of recording. In another non-limiting example, archive data 150 may be processed ECG data stored in a database. Continuing, this processed data may undergo initial analysis and filtering to remove noise and artifacts, and may also include derived parameters such as heart rate, QRS complex durations, and ST segment deviations. For example, without limitation, archive data 150 may include processed data 126.

With continued reference to FIG. 1, as used in this disclosure, a "prediction generator" is a component or system within machine learning and artificial intelligence frameworks designed to forecast outcomes based on input data. Without limitation, the prediction generator 138 may receive as input the plurality of labeled training data 140 and output the plurality of labeled data 152. In a non-limiting example, prediction generator 138 may be trained to analyze patterns and relationships within the data, generating predictions that can range from simple numerical values to complex classifications. For instance, without limitation, the prediction generator 138 may receive patient time-series data, such as at least a potential signal 112, and forecast the likelihood of a cardiac condition and/or disease. Without limitation, prediction generator 138 may operate by applying algorithms developed during the model training phase to new, unseen data. Without limitation, these algorithms may include a variety of machine learning techniques such as regression, classification, neural networks, and decision trees. Without limitation, prediction generator 138 may use the patterns and parameters learned during training to make informed predictions. For example, without limitation, a neural network-based prediction generator 138 may process input data through multiple layers of neurons, each performing calculations that contribute to the final output, which is the predicted result.

Additionally and or alternatively, prediction generator 138 may include systems for evaluating its predictions, such as confidence scores or probabilities, which may provide users with information regarding prediction generator 138 certainty and potential accuracy of the plurality of labeled data 152. In a non-limiting example, prediction generator 138 may include updates and be retrained with new data to ensure that prediction generator 138 remains effective and relevant over time, adapting to changes and improving its predictive capabilities. For example, without limitation, prediction generator 138 may be retrained using a user input 162 as discussed in more detail below.

With continued reference to FIG. 1, the plurality of labeled training data 140 may include at least a signal segment 144 associated with at least a segment annotation 146. In a non-limiting example, the input data may include a plurality of signal segment 144, where each signal segment 144 is associated with a segment annotation 146 of a plurality of segment annotations. As used in this disclosure, a "signal segment" is a distinct, contiguous time-dependent portion of a signal that has been isolated. As used in this disclosure, a "segment annotation" is an annotation, a tag, or identifier assigned to a specific part or segment of processed data 126 to categorize or describe its characteristics. For example, signal segment 144 t=20 ms to t=46 ms may have segment annotation 146 "AFib" to identify a cardiac signal with an absence of distinct P-waves, irregularly irregular QRS complexes. Additionally and or alternatively, signal segment 144 t=47 ms to t=73 ms may be labeled "Normal Sinus Rhythm," indicating a regular sequence of P-waves, QRS complexes, and T-waves occurring at expected intervals. In another non-limiting example, plurality of labeled training data 140 may include signal segment 144 from t=74 ms to t=100 ms with the segment annotation 146 of "PVC" (Premature Ventricular Contraction) may indicate a premature, wide QRS complex without a preceding P-wave. In another non-limiting example, plurality of labeled training data 140 may include signal segment 144 of t=101 ms to t=127 ms with segment annotation 146 of "STEMI" (ST-Elevation Myocardial Infarction), distinguished by an elevated ST segment above the baseline, signaling a potential acute myocardial infarction. In another non-limiting example, plurality of labeled training data 140 may include signal segment 144 from t=128 ms to t=154 ms with the segment annotation 146 of "Bradycardia," which shows a slower-than-normal heart rate, typically less than 60 beats per minute, with otherwise normal waveform patterns. In another non-limiting example, plurality of labeled training data 140 may include the segment from t=155 ms to t=181 ms with the segment annotation 146 of "Tachycardia," indicating a faster-than-normal heart rate, over 100 beats per minute, while maintaining normal waveform morphology. In another non-limiting example, plurality of labeled training data 140 may include signal label as "Artifact" to denote portions of the signal that are affected by external noise or movement, and thus not useful for diagnostic purposes. For instance, signal segment 144 of t=182 ms to t=208 ms may include segment annotation 146 of "Artifact" due to high-frequency noise superimposed on the cardiac signal.

With continued reference to FIG. 1, the plurality of labeled training data 140 may be produced through data collection, preprocessing, manual annotation, automated processes, any combination thereof, and the like. For example, cardiologists and trained medical professionals may manually review ECG signals and annotate different segments based on their expertise. Continuing, the cardiologists and trained medical professionals may label segments as "AFib," "Normal Sinus Rhythm," "PVC," "STEMI," etc., by visually inspecting the patterns in the ECG data. Continuing, these annotations may serve as training data for training machine learning models. For instance, without limitation, a cardiologist may identify and label signal segment 144 from t=1000 ms to t=1046 ms as "AFib" due to the absence of distinct P-waves and the presence of irregularly irregular QRS complexes.

With continued reference to FIG. 1, in a non-limiting example, prediction generator 138 may be consistent with one or more aspects of the simulation module described, U.S. patent application Ser. No. 18/973,039, filed on Dec. 8, 2024, titled "APPARATUS AND METHOD FOR DETERMINING A LABEL DYNAMICALLY FOR A POTENTIAL SIGNAL," which is incorporated by reference herein in its entirety.

With continued reference to FIG. 1, prediction generator 138 may include semi-supervised machine learning model 148, wherein semi-supervised machine learning model 148 may include a neural network. As used in this disclosure, a "semi-supervised machine learning model" is a machine learning model that uses advanced algorithms that combines supervised and unsupervised learning by using both labeled and unlabeled data to train artificial intelligence (AI) models for classification and regression tasks. In a non-limiting example, prediction generator 138 may combine a smaller set of labeled data with a larger pool of unlabeled data, the model can learn underlying patterns and structures more effectively than using labeled data alone. For example, prediction generator 138 may be trained on a few labeled cardiac signals along with many unlabeled ones. Continuing, this may enable prediction generator 138 to generalize better and generate more accurate predictions.

Still referring to FIG. 1, prediction generator 138 generates plurality of labeled data 152 as a function of dynamic data. As used in this disclosure, "dynamic data" is data that is continuously updated or changed in real-time. In a non-limiting example, at least a potential signal 112 may include dynamic data. In another non-limiting example, at least a position signal 118 may include dynamic data. In a non-limiting example, a recording system may be configured to capture real-time data, dynamic data, associated with the cardiac signals of the patient. For example, the recording system may include at least a catheter, at least a transducer, at least a localization system, and the like.

Still referring to FIG. 1, downstream device 154 displays the plurality of labeled data 152 to a user interface 156 of a graphical user interface 158. As used in this disclosure, a "downstream device" is an electronic device that presents information to the entity. In some cases, downstream device 154 may be configured to project or show visual content generated by computers, video devices, or other electronic mechanisms. In some cases, downstream device 154 may include a liquid crystal display (LCD), a cathode ray tube (CRT), a plasma display, a light emitting diode (LED) display, and any combinations thereof. In a non-limiting example, one or more downstream device 154 may vary in size, resolution, technology, and functionality. Downstream device 154 may be able to show any data elements and/or visual elements as listed above in various formats such as, textural, graphical, video among others, in either monochrome or color. Downstream device 154 may include, but is not limited to, a smartphone, tablet, laptop, monitor, tablet, and the like. Downstream device 154 may include a separate device that includes a transparent screen configured to display computer generated images and/or information. In some cases, downstream device 154 may be configured to present a graphical user interface 158 (GUI) to a user, wherein a user may interact with a GUI 158. In some cases, a user may view a GUI 158 through downstream device 154. Additionally, or alternatively, processor 102 be connected to downstream device 154. In one or more embodiments, transmitting the plurality of labeled data 152 may include displaying the plurality of labeled data 152 at downstream device 154 using a visual interface.

With continued reference to FIG. 1, as used in this disclosure, a "graphical user interface" is a graphical form of user interface that allows users to interact with electronic devices. In some embodiments, GUI 158 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 158. For example, links to decentralized platforms as described in this disclosure may be incorporated using icons. Using an icon may be a fast way to open documents, run programs etc. because clicking on them yields instant access.

With continued reference to FIG. 1, as used in this disclosure, a "user interface" is a digital display that presents information, options, interactive elements to users in an intuitive and visually appealing manner. In some embodiments, user interface 156 may include at least an interface element. As used in this disclosure, "at least an interface element" is a portion of user interface 156. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler.

With continued reference to FIG. 1, displaying the plurality of labeled data 152 to the user interface 156 may include visual indicator 160. As used in this disclosure, a "visual indicator" is a graphical or visual element that provides information or feedback to a user. In a non-limiting example, the visual indicator 160 may include color-coded bars on a dashboard that represent different types of cardiac events detected in an ECG reading. For instance, without limitation, normal sinus rhythms might be displayed in green, atrial fibrillation in red, and premature ventricular contractions in yellow. Continuing, color-coding may provide immediate visual recognition of the different types of events and thereby may help healthcare providers quickly assess a patient's cardiac condition.

In another non-limiting example, the visual indicator 160 may include a series of trend graphs displayed on a user interface 156, illustrating the frequency and duration of various cardiac events over time. As used in this disclosure, "trend graphs" are visual representations that illustrate how data points change over time, allowing users to observe patterns, trends, and anomalies within a dataset. For example, the graph may show the number of atrial fibrillation episodes occurring each day over a month, providing a clear visual representation of the patient's cardiac health trends. Continuing, the trend graphs may help in identifying patterns and correlations that may not be immediately apparent through raw data alone, supporting more informed clinical decision-making. Without limitation, trend graphs may be used to display the frequency and duration of cardiac events such as atrial fibrillation, normal sinus rhythm, and premature ventricular contractions over a specified period. For example, the trend graph may show daily counts of atrial fibrillation episodes over a month. Continuing, the x-axis may represent time (days, weeks, months), while the y-axis may represent the number or severity of events. Continuing, this visualization may help healthcare providers quickly assess changes in a patient's condition and identify any concerning trends that may require further investigation or intervention.

Additionally and or alternatively, the visual indicator 160 may include interactive elements such as clickable icons or buttons that provide more detailed information when selected. For example, without limitation, the user may click on an icon representing a specific cardiac event to view a detailed report of that event, including its exact time, duration, and any associated physiological data. Continuing, this interactive capability may enhance the user experience by providing easy access to comprehensive data without overwhelming the user with too much information at once.

In another non-limiting example, the visual indicator 160 may include a heatmap that displays the intensity of cardiac events across different segments of the ECG data. Continuing, the heatmap may use varying colors to represent the severity or frequency of events, with darker shades indicating more frequent or severe occurrences. Without limitation, this type of visual representation may quickly highlight areas of concern within the data, allowing clinicians to focus their attention on the most critical parts of the ECG signal.

In another non-limiting example, the visual indicator 160 may include alert symbols. Without limitation, the alert symbols may include notifications that appear when certain thresholds are crossed. For example, without limitation, if the system detects an unusually high number of ventricular contractions within a short period, an alert symbol could appear on the screen, prompting the healthcare provider to take immediate action. Without limitation, the alerts may ensure that critical information is communicated promptly and clearly, supporting timely interventions and improving patient outcomes.

Still referring to FIG. 1, processor 102 is configured to receive user input 162 associated with the plurality of labeled data 152. As used in this disclosure, a "user input" is any data or information that a user provides to a system, application, or device. In a non-limiting example, user input 162 may include input into the system by one or more cardiologists, trained medical professionals, and the like. With continued reference to FIG. 1, prediction generator 138 is retrained using user input 162.

In a non-limiting example, user input 162 may include one or more of correction datum 164 and confirmation datum 166. As used in this disclosure, a "correction datum" is a specific piece of data used to adjust, modify, or correct another piece of data. In a non-limiting example, the correction datum 164 may provide a reference or baseline to ensure accuracy and consistency in the plurality of labeled data 152. Without limitation, the correction data may account for errors produced by prediction generator 138. As used in this disclosure, a "confirmation datum" is a specific piece of data that verifies that another piece of data is accurate. For example, without limitation, the confirmation datum 166 may be the user selection of a checkbox to confirm that prediction generator 138 output accurate labeled data 152. In the previous non-limiting example, the confirmation datum 166 may include a user confirming by clicking a button that says, "Confirm Data" to confirm that the plurality of labeled data 152 output form prediction generator 138 is correct after reviewing the data. In another non-limiting example, the confirmation datum 166 may include an integrated peer review process, where multiple users, such as a team of healthcare professionals, review the plurality of labeled data 152 independently. Continuing, each reviewer may provide their confirmation, and the apparatus may only accept the plurality of labeled data 152 as accurate if a consensus is reached. Continuing, this collaborative approach may help ensure that segment annotation 146 and signal segment 144 are thoroughly vetted by multiple experts.

Without limitation, the correction datum 164 may include one or more of signal segment correction 168 and segment annotation correction 170. As used in this disclosure, a "signal segment correction" is a modification of signal segment 144 captured by prediction generator 138 for a given labeled datum. For example, signal segment correction 168 may include "t=20 ms to t=46 ms" to overwrite prediction generator 138 output for signal segment 144 of "t=20 ms to t=32 ms." Additionally and or alternatively, signal segment correction 168 may include adjusting signal segment 144 from "t=50 ms to t=75 ms" to correct an incorrectly labeled signal segment 144 of "t=50 ms to t=65 ms," thereby ensuring signal segment 144 accurately captures the duration of the event. In another non-limiting example, signal segment correction 168 may include modifying the segment "t=100 ms to t=130 ms" to overwrite prediction generator 138 output for signal segment 144 of "t=100 ms to t=120 ms," extending signal segment 144 to account for the entire duration of the detected event.

With continued reference to FIG. 1, as used in this disclosure, a "segment annotation correction" is a modification of the signal annotation captured by prediction generator 138 for a given labeled datum. For example, without limitation, segment annotation correction 170 may include "Afib" segment annotation 146 where prediction generator 138 output the incorrect segment annotation 146 of "Normal Sinus Rhythm." In another non-limiting example, segment annotation correction 170 may include identifying signal segment 144 as "PVC" (Premature Ventricular Contraction)

when prediction generator 138 mistakenly labeled it as "Normal Sinus Rhythm." Continuing, this correction may ensure that the distinct characteristics of PVCs, such as the premature occurrence of a wide and bizarre QRS complex without a preceding P-wave, are accurately captured in the data. Additionally and or alternatively, segment annotation correction 170 may include re-labeling signal segment 144 from "Tachycardia" to "Bradycardia" if prediction generator 138 incorrectly identified a high heart rate when, in fact, the heart rate was low.

With continued reference to FIG. 1, in a non-limiting example, prediction generator 138 may be consistent with one or more aspects of the systems described, U.S. patent application Ser. No. 18/786,066, filed on Jul. 26, 2024, titled "APPARATUS AND A METHOD FOR A PLURALITY OF TIME SERIES DATA," which is incorporated by reference herein in its entirety.

Figure 2:
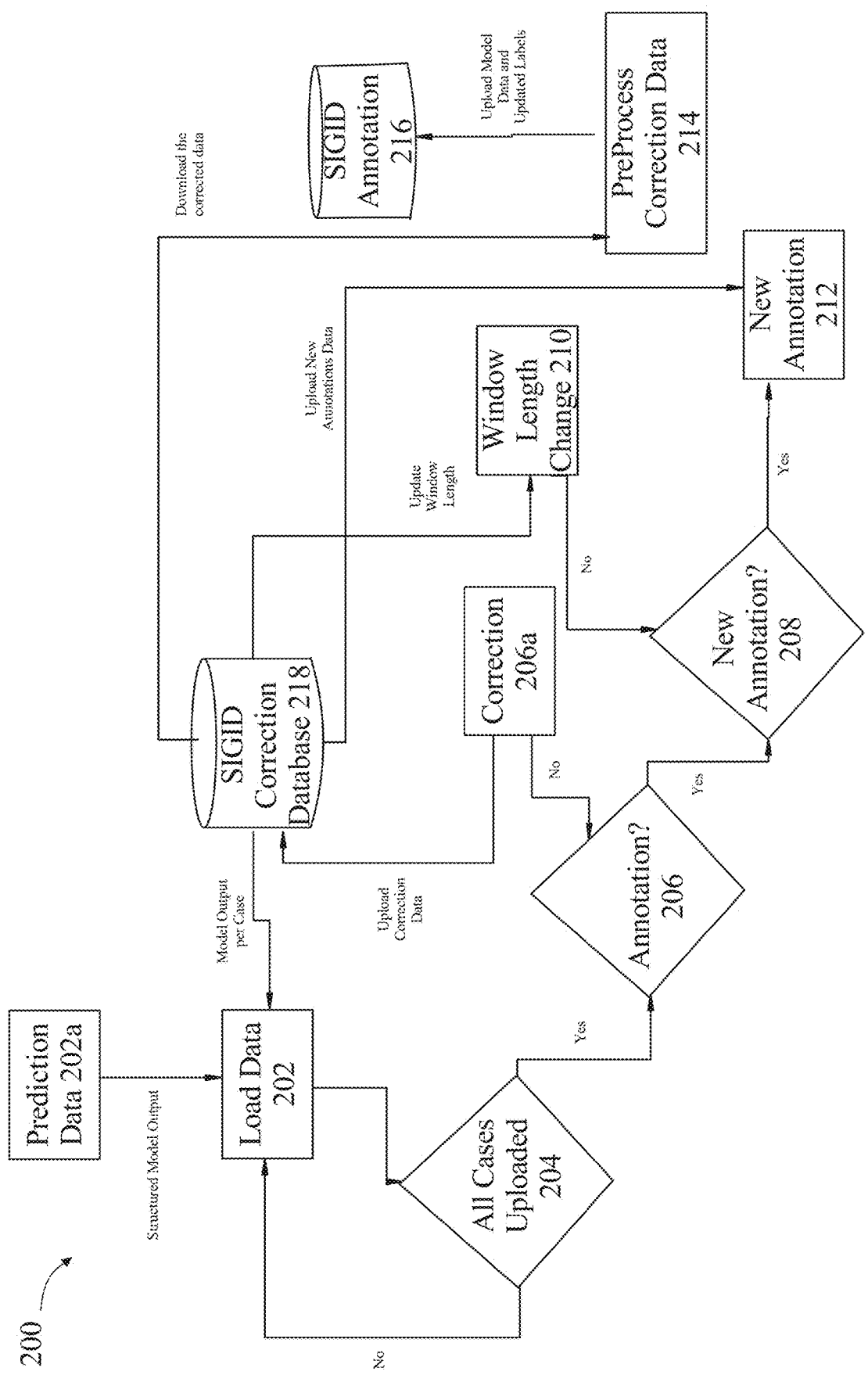
FIG. 2 illustrates a flowchart for implementation of a semi-supervised machine learning model, according to an embodiment of the present disclosure.

Referring now to FIG. 2 illustrates a flowchart for implementation of a semi-supervised machine learning model 200, according to an embodiment of the present disclosure. At 202, one or more data may be loaded to SIGID correction database 218. In an embodiment, the one or more data may correspond to one or more signals, such as intracardiac signals. Examples of the intracardiac signals may include but are not limited to electrocardiogra (ECG) signals, surface cardiac signals, electrogram (EGM) signals, pulmonary vein potential (PVP) signals, brain signals, and the like. In an embodiment, the one or more data may be labeled based on input data. The input data may include, but are not limited to, electrocardiogramata, echocardiography data, for example, 12-lead electrocardiogra (before/during/after ablation), intracardiac signal data, surface cardiac data, cardiac computed tomography (CT) data, cardiac magnetic resonance imaging (MRI) data, non-cardiac mapping data, procedure data, historical procedure data, comorbidities data, intracardiac electro gram (EGM) (before/during/after ablation) data, catheter positional stability data, catheter temperature data, catheter contact force data, ablation delivery data, cryoablation data, radiofrequency ablation data, pulsed field ablation data, and the like. In some embodiments, the one or more data may include waveforms related to model output per case. In an example, the model output per case may be associated with prediction data 202a. In an example the prediction data 202a may correspond to one or more labels predicted by the model associated with one or more case. Further, the prediction data 202a may be loaded to SIGID correction database 218.

With continued reference to FIG. 2, at 204, a determination is made whether the received one or more data is uploaded for all cases or not. If the one or more data is uploaded, then at 206, the model may receive user input to determine whether the annotations need to be corrected or not. In some embodiments, the annotations may correspond to predictions by the model. If the annotations are correct, then at 206a, the correct annotation data may be uploaded to the SIGID correction database 218. However, if the annotations are not correct, then at 208, a determination is made whether a new annotation may be required or not. If the new annotation is not required, then at 210, an annotation window length is updated, and the updated window length is sent to the SIGID correction database 218. However, if the new annotation is required, then at 212, the new annotation is added to the signal (such as, the waveform). In an embodiment, the model is configured to determine whether a correction is required for the annotations or not based on a user input indicative of the correction via the user interface. Further, the correction may correspond but not limited to correction of a wrongly classified annotation or modification of a label associated with a segment of the annotation. In an example, if the clinician scans through the annotations and decide that a label associated with the segment of the annotation model is correct, however a length of the segment of the annotation model is not correct. In such a case, the model is configured to receive a user input to shorten the length of existing segment. In another example, if the clinician scans through the annotations and decides that a label associated with the segment of the annotation model is misclassified. In such a case, the model is configured to receive a user input to annotate a new segment. In an example, if the clinician scans through the annotations and decides that a label associated with the segment of the annotation model is missed. In such a case, the model is configured to receive a user input to insert a label to the segment missed by the model.

With continued reference to FIG. 2, at 214, correction data may be pre-processed. In an embodiment, the correction data may correspond to the new annotation data being added to the signal. Thereafter, the correction data is added to the SIGID correction database 218. The pre-processing of the correction data, may include, at least one of, removing duplicates, standardizing formats, and scaling features. In an embodiment, the pre-processing of the correction data may be based on analysis of the new annotations added. In an example, the pre-processing of the correction data may include overlapping segments of the annotation, such as, a first segment of the annotation may overlap a second segment of the annotation. In such a case, the model may be configured to modify a label associated with the second segment of the annotation as 'yes' label. The yes label indicates a true value. In an example, a user, such as a technician or clinician may scan through the new annotations added by the model and thereafter, provide user input to the model to determine whether the model has accurately predicted the annotations for the signal or not. Further, the model may receive the corrected data corresponding to the case. Additionally, the model may generate labels for the corrected data (such as the segments of the annotations). In an example, the model may be configured to generate random labels associated with the segment of the annotations. In some embodiments, the generated labels may be stored in the SIGID Annotations database 216.

Figure 3:
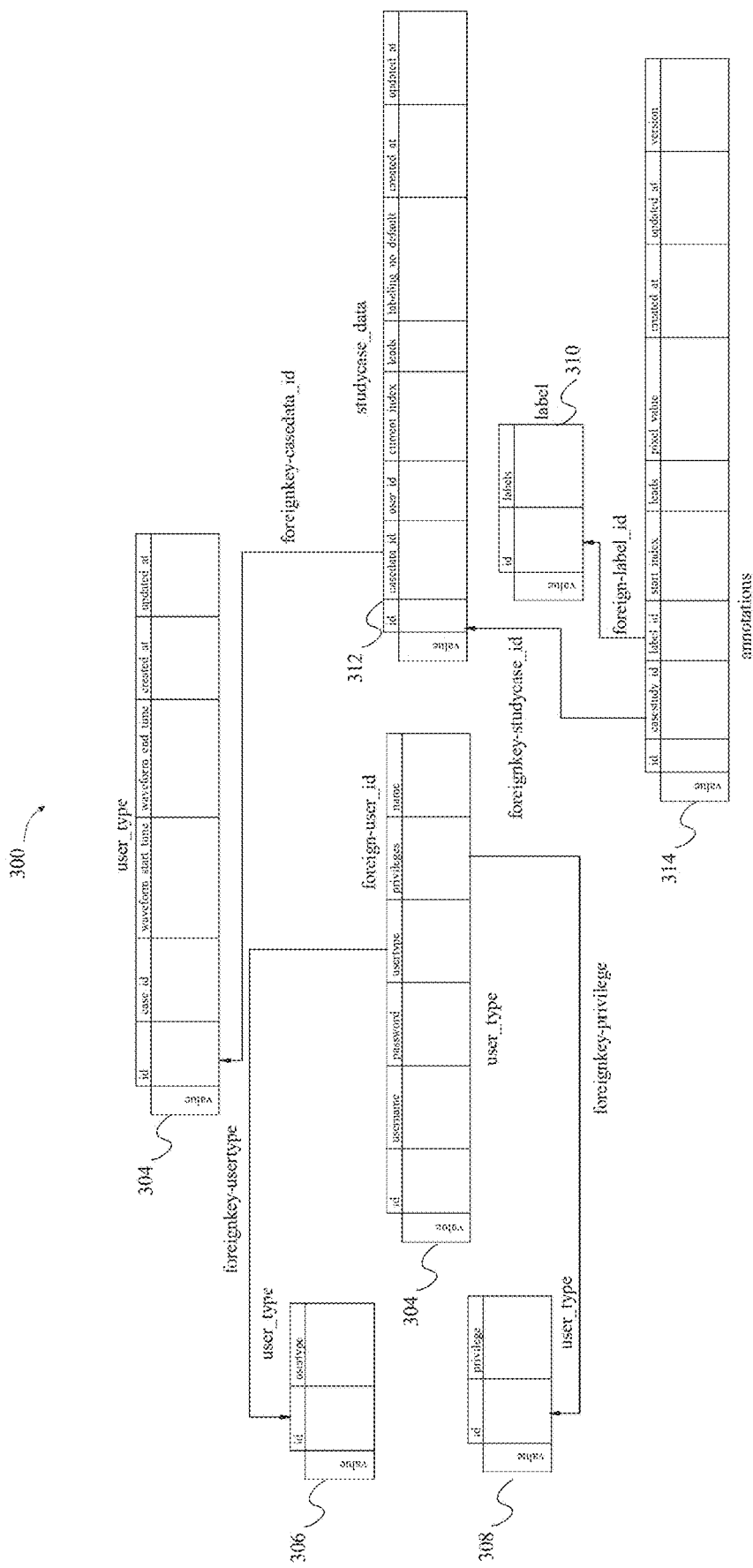
FIG. 3 illustrates a schematic for generating labels for the semi-supervised machine learning model, according to an embodiment of the present disclosure.

Referring now to FIG. 3, a schematic for generating labels for the semi-supervised machine learning model, according to an embodiment of the present disclosure. The Sigid database 300 may include a case_data table 302, a user table 304, a user_type table 306, a privilege table 308, label table 310, a studycase_data table 312, and an annotations table 314. Further, the case_data table 302 may be used to maintain records corresponding to one or more cases that have been annotated by the model and has been uploaded to the table for correction. For example, the case_data table 302 may include information associated with but not limited to id, case_id, waveform_start_time, created_at and updated_at. The values in the column id May be related to a unique integer corresponding to each case. In some embodiments, the values in the column id may correspond to primary key, such that the value in the corresponding column may increment automatically. The values of the column case_id may be related to a unique integer such that each case of the one or more cases may have its own unique id. The values of the column waveform_start_time, created_at and updated_at may be related to time stamp associated with the signal where the signal may start, may be annotated and changed, respectively. In an embodiment the user table 304 may be used to maintain records corresponding to one or more users. For example, the user table 304 may include information associated with but not limited to id, username, password, usertype, privileges, name. The values in the column username may be related to a name of the user, the value in the column password may be related to unique password for authentication, the values of the column usertype for example, application or clinician, and model annotation. In some embodiments, the usertype, and the privileges may correspond to foreign key, such that privilege foreign key refers to id in privilege table 308, and values of the column usertype, foreign key, may refers to id in user_type table 306. In some embodiments, the user table 304 may consist of the name of the user and model which may mapped to the key that is referenced by the studycase_data table 312.

With continued reference to FIG. 3, user_type table 306 maps the unique id (from the user table 304) to the type for the user which where this id later used as the foreign key in the user table 304. The privilege table 308 maps the id to privilege names for each user, and the label table 310 may be used to store the label names mapped to particularly integer id. For example, the labels that may be used are yes and no, such that yes indicates a presence of the PVP signal in the segment of the annotation, or no indicates an absence of the PVP signal in the segment of the annotation. The studycase_data table 312 may be used to map the case to each user they have accessed for viewing or annotation. The studycase_data table 312 may allow the model to access one or more records for the same case but with different users. For example, a first record for a first case done by model and a second record for the first case done by the user. In some embodiment, the column label_id in the annotations table 314 may relate to a unique integer, thereby used as the primary key, such that it may be referred by the annotations table 314 as the foreign key.

With continued reference to FIG. 3, the annotation table 314 may initially include the prediction data by the model during the real time simulations. The annotation table 314 may further include an array of the values in the column pixel_values where the positive labels have the array of 1's and negative labels contain the array of values 0's. Here, 1 indicates that the area below the positive labels should be highlighted in brown indicating the toggle below it that allows the user to change the labels from yes to no. For example, the annotation table 314 may include but not limited to id, studycase_id, start_index, end_index, label_id, created_at, updated_at, pixel_values, and version. The id is a primary key and auto increment automatically. The studycase_id is a foreign key that may refer to the id in the studycase table 312. Further, the studycase_id may be associated with case and user annotation. The start_index, and the end_index may refer to start of labeled segment with relative to length of the total signal at that lead, and end of labeled segment with relative to length of the total signal at that lead, respectively. The leads may indicate the lead at which annotation is present, and the label_id is a foreign key that may refers to the primary key in the label table 310. The label_id may suggest what class the label id belongs to. The pixel_values may be associated with array of the either 0's or 1's indicating a color below the area of segment. Such pixel values may be defined in a User interface (UI) as the one or more colors, for example, brown, white, and the like. The version may indicate version v2 in case where user corrects the data or creates the new window or shorten the length of existing window.

With continued reference to FIG. 3, in an example, the column id is a primary key that includes the unique integer value, the column casedata_id (in the studycase_data table 312) is a foreign key that refers to the id for the case in the case_data table 302, the column user_id (in the studycase_data table 312) is a foreign key that refers to the id in user table 304. Further, the values in the column current_index, leads (in studycase_data table 312) include leads accessed during the viewing and annotation.

With continued reference to FIG. 3, in an example, we map the casename to the studycase id in the annotation table 314 where now each record has been mapped to the corresponding case. Further, the dataframe may be chunked into the respective cases, and for each chunk a given procedure may be performed. For example, each caseid receive all the corrections or records with version as V2. There are 3 cases that the record can be classified either into If the version is v2, studycase_id belong to the model and case being accessed then for that record we check if there are any overlapping rows for given start index, end index and leads. If present, check the studycase_id if it belongs to the clinician or model and has updated time greater than the one being currently considered. If clinician, then classify it as the window change or else classify it as the correction. If version of the record is v2, studycase_id belongs to the user/clinician annotating classify this record as the new annotation. The segments that are rejected or cannot be used should be flagged as the reject annotations. After removing the unusable rows keep all the uncorrected records for the case, convert the labels for corrections as 2 or no and convert window change and new annotations as yes. Merge all the records for the case and upload it to the SIGID database in an annotation table where rest of the previously labeled data is kept. This exercise helps to achieve the following goals: Visual inspection for the quality of real time prediction by the clinicians, More labels for the training data. Thereafter, upload the model data and updated labels SIGID annotation database.

Figure 4:
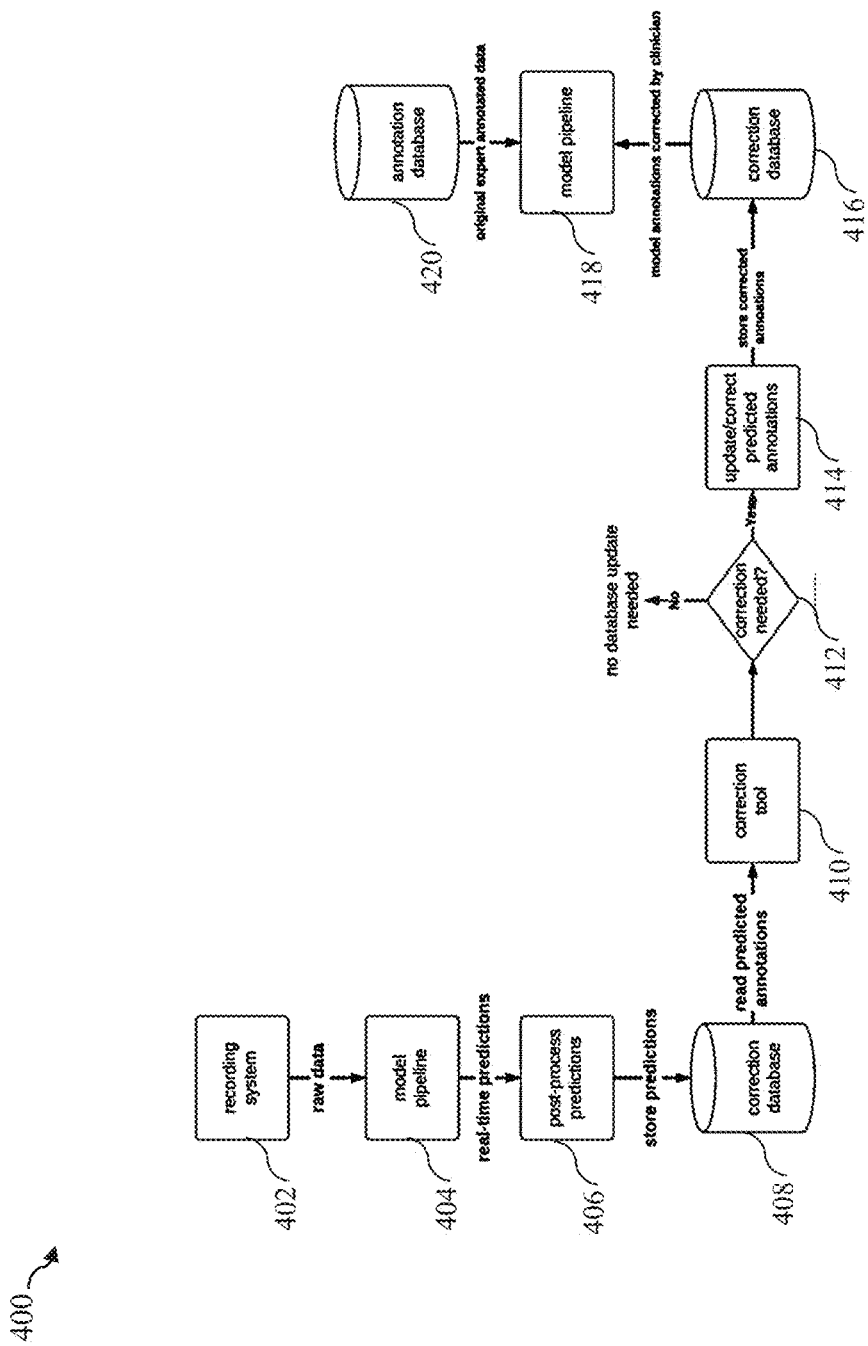
FIG. 4 illustrates an exemplary flowchart for implementation of the semi-supervised machine learning model, according to an embodiment of the present disclosure.

Referring now to FIG. 4, an exemplary flowchart for implementation of the semi-supervised machine learning model 400, according to an embodiment of the present disclosure. At 402, one or more raw data may be generated by the model. The one or more raw data may be received by the model pipeline. At 404, one or more predictions may be generated by the model. The one or more predictions, for example, real time predictions may be received by the system for post-process predictions. At 406, the post-process predictions may be generated. Such predictions may be stored in correction database. At 408, the correction database may generate annotations based on the stored predictions. At 410, the correction tool may receive the predicted annotations. In an embodiment, the correction tool may allow the user to view the data predicted by the model superimposed on the waveforms protobuf data or correct the either the labels of prediction or shorten the windows for prediction by keeping labels intact. Further, the correction tool may also allow the user to label new data in case the model has missed the prediction on particular region.

With continued reference to FIG. 4, at 412, the model may receive user input to determine whether the annotations need to be corrected or not. If the annotations are correct and no correction may be required, then the correction database may not be updated. If the annotations need correction, then at 414, the annotations may be updated or corrected, based on the received user input. At 416, the updated annotations may be stored in the correction database. At 418, the model may analyze the original annotations and the updated annotations. In an example, the original annotations may be stored in the annotation database 420, and the updated annotations may be stored in the correction database.

With continued reference to FIG. 4, in an embodiment, the model may refer to as a semi-supervised machine learning model. Further the semi-supervised machine learning model may allow the clinician or technician to scan through the predictions of the model, thereby determining whether the model has accurately predicted the labels for the selected input data or not. In an embodiment, the model may be configured to receive a user input indicative of a corrective factor for at least one segment of the one or more signals mapped with at least one label. In some embodiments, the model may be configured to receive the user input indicative of the corrective factor via the user interface (described further in FIG. 4). In an example, the clinician or technician may provide user input, via the user interface, to the model to change or correct the predictions done by the model. Further, the model may be configured to update the at least one label of the list of labels mapped with the at least one segment of the one or more signals based on the received user input. In one example embodiment, based on the user input, the model may be configured to update the yes label associated with the at least one segment to the no label. In another example embodiment, based on the user input, the model may be configured to map the at least one label to the mapped at least one segment of the one or more signals. In yet another example embodiment, based on the user input, the model may be configured to remove the at least one label to the mapped at least one segment. Additionally, or alternatively, the model may be configured to revert one or more label changes based on the user input. As a result, the model may utilize the received user input to generate accurate and robust predictions. Additionally, the model may utilize the predictions to generate training data for the model, thereby reducing various challenges related to traditional signal labelling procedures such as signal interpretation subjectivity, human errors and training requirements.

With continued reference to FIG. 4, in an embodiment, the model may load the prediction data. In an example, the one or more labels predicted by the model may correspond to an output of the predictions from the real time simulator, for example the semi-supervised machine learning model. Such an output may be stored in the dataframe for each index and lead. The said predictions may be stored in a structured format where the one or more data is converted into a tabular format. In such a case, each prediction may include information associated with a unique id, a lead it is present in, a start index and an end index in relative to the total length of the signal (such as, a waveform) at that lead, a date and a time which it was created. In some embodiments, the predictions by the model may correspond to the new annotations. Such annotations may be used by the clinicians or technicians may use the annotations to diagnose the abnormalities. In an example, the prediction for each case is pre-processed and then uploaded to the database for the correction. The bin files for these cases are also produced and are shared with the clinicians using the s3.

Figure 5A:
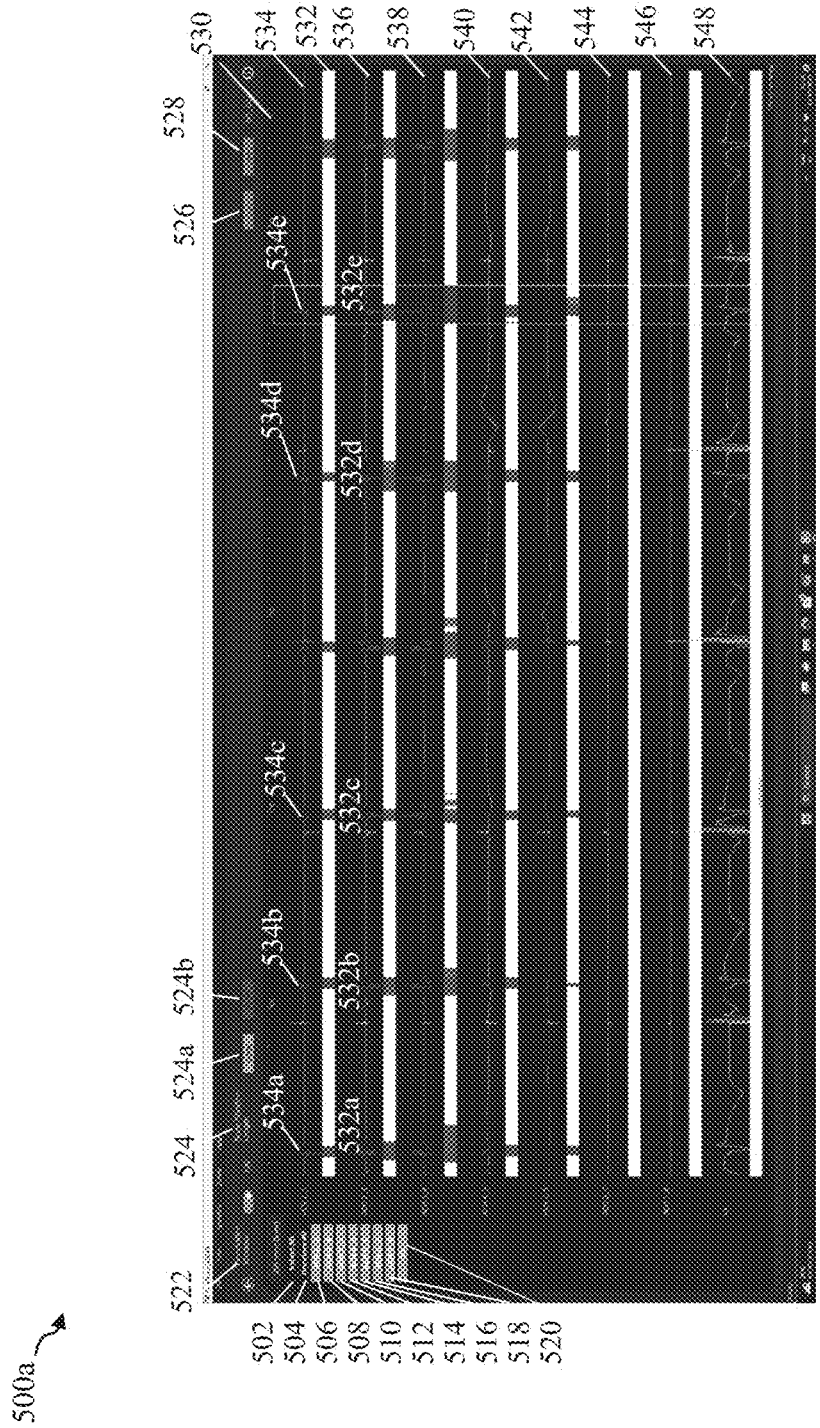
FIG. 5A illustrates a user interface for displaying labeled one or more signals, in accordance with an example embodiment.

Referring now to FIG. 5A illustrates a user interface for displaying labeled one or more signals, in accordance with an example embodiment. The user interface 500a may include a plurality of options such as a select all option 502, a unselect all option 504, an ACH 1-2 option 506, an ACH 2-3 option 508, an ACH 3-4 option 510, an ACH 4-5 option 512, an ACH 5-6 option 514, an ACH 6-7 option 516, an ACH 7-8 option 518, an V1 option 520, an annotation window option 522, a scale length window option 524, a previous annotation window option 526, and a next annotation window option 528, a waveform representation 530, and an annotation 532. Further, the waveform representation 530 may comprise the one or more signals such as an intracardiac signal.

With continued reference to FIG. 5A, in an embodiment, the waveform representation 530 may comprise the one or more signals such a signal 534, a signal 536, a signal 538, a signal 540, a signal 542, a signal 544, a signal 546, and a signal 548. For example, the select all option 502 may be configured to display each signal of the labeled one or more signals associated with the waveform representations 530. The unselect all option 504 may be configured to hide each signal of the labeled one or more signals associated with the waveform representation 530. The ACH 1-2 option 506, the ACH 2-3 option 508, the ACH 3-4 option 510, the ACH 4-5 option 512, the ACH 5-6 option 514, the ACH 6-7 option 516, the ACH 7-8 option 518 may be configured to display or hide corresponding one or more signals. For example, the ACH 1-2 option 506 may be configured to display or hide the signal 534. The ACH 2-3 option 508 may be configured to display or hide the signal 536. The ACH 3-4 option 510 may be configured to display or hide the signal 538. The ACH 4-5 option 512 may be configured to display or hide the signal 540. The ACH 5-6 option 514 may be configured to display or hide the signal 542. The ACH 6-7 option 516 may be configured to display or hide the signal 544. The ACH 7-8 option 518 may be configured to display or hide the signal 546. The VI option 520 may be configured to display or hide the signal 548.

With continued reference to FIG. 5A, in an embodiment, each of the one or more signals may comprise one or more labeled segments. In an example, the signal 534 may comprise a labeled segment 534a, a labeled segment 534b, a labeled segment 534c, a labeled segment 534d, and a labeled segment 534e. In some embodiments, the user interface 500a may be configured to display the at least one segment of the labeled one or more signals with a first visual indicator different from a visual indicator of the labeled one or more signals. In an example embodiment, the at least one segment of the labeled one or more signals with a first color different from a color of the labeled one or more signals. In some embodiments, the first color may be specified based on at least one label of the list of labels. For example, the first color may be specified as a purple color based on the yes label. In another example embodiment, the first color may be specified as a red color based on the no label. Further, in some embodiment, the different color may be specified as a green color. Hence, in an example embodiment, the signal may be displayed with the green color. Further, the labeled segment 534a, the labeled segment 534b, the labeled segment 534c, the labeled segment 534d, and the labeled segment 534e may be displayed with the purple color to indicate the characteristics of the specific parameter in the signal. Some embodiments are based on an objective to display or hide the labeled one or more signals based on the plurality of options. Specifically, a respective option of the plurality of options may be configured to display or hide a respective signal agnostic to other signals of the labeled one or more signals.

With continued reference to FIG. 5A, the annotation window option 522 may be configured to enable the annotation window. The size of the annotation window may indicate a size of the at least one segment of the one or more signals mapped with the at least one label of the list of labels. Further, the annotation window may be depicted as a segment of the annotated signal enclosed with a thin rectangular box. As shown in FIG. 5, the annotation window may comprise an annotation segment 532a, an annotation segment 532b, an annotation segment 532c, an annotation segment 532d, and an annotation segment 532e. In some embodiments, the user interface 500a may be configured to display the at least one segment of the annotated one or more signals with a first visual indicator different from a visual indicator of the annotated one or more signals. In an example embodiment, the at least one segment of the annotated one or more signals with a first color different from a color of the annotated one or more signals. In some embodiments, the first color may be specified based on at least one label of the list of labels. For example, the first color may be specified as a brown color based on the yes label. In another example embodiment, the first color may be specified as a white color based on the no label. Further, in some embodiments, the different color may be specified as a yellow color.

With continued reference to FIG. 5A, in some embodiments, a color of the respective segment of the annotated one or more signals indicates at least one: the one or more characteristic of the specific parameters of the one or more signal parameters or the user input indicative of the corrective factor corresponding to the at least one respective segment of the labeled one or more signals. For example, a white color of the respective segment of the annotated one or more signals may indicate an absence of yes label of the list of labels. Further, the white color may indicate the presence of the no label. Further, a brown color of the respective segment of the annotated one or more signals may indicate a presence of the yes label.

With continued reference to FIG. 5A, a yellow color of the respective segment of the annotated one or more signals may indicate the corrective factor corresponding to the at least one respective segment of the labeled one or more signals. In an example embodiment, the yellow color may indicate a label change associated with the user validation, for example, the yes label may be changed to the no label based on the user validation.

With continued reference to FIG. 5A, a light brown color of the respective segment of annotated one or more signals may indicate the corrective factor corresponding to the at least one respective segment of the one or more signals. In an example embodiment, the yellow color may indicate a label addition associated with the user validation, for example, the yes label may be added to the at least one respective segment of the labeled one or more signals based on the user validation. In another example embodiment, the size of the annotation window may be changed based on the user validation.

With continued reference to FIG. 5A, in an example embodiment, the annotation segment 532a, the annotation segment 532b, the annotation segment 532c, the annotation segment 532d, and the annotation segment 532e may be displayed with the brown color to indicate that a segment of the signal 534 is annotated by the model.

With continued reference to FIG. 5A, the scale window length option 524 may be configured to change the size of the annotation window. The scale length window option 524 may include a plurality of scale length window options, for example, a scale length window option 50 ms 524a, and a scale length window option 100 ms 524b. The scale length window option 50 ms may be configured to specify the size of the annotation window as 50 ms. The scale length window option 100 ms may be configured to specify the size of the annotation window as 100 ms. The scale length window option 150 ms may be configured to specify the size of the annotation window as 150 ms. The scale length window option 200 ms may be configured to specify the size of the annotation window as 200 ms.

With continued reference to FIG. 5A, the previous annotation window option 526 may be configured to change the current location of the annotation window to a previous location of the annotation window 534. The next annotation window 528 may be configured to change the current location of the annotation window to a next location of the annotation window.

With continued reference to FIG. 5A, in some embodiments, the annotation window option 522 may be enabled to validate the labeled one or more signals. Accordingly, a user interface is provided to validate the labeled one or more signals. In an embodiment, the correction tools may allow the user to view the predictions of the model evaluation in real time streaming in the static way. In such a scenario, the labels in the database are loaded in the tool and are superimposed on the protobuf files for the case. After careful examinations for the labels the user can perform the functionalities such as but not limited to correction of the existing labels, changing window length of existing labels, and creating the new annotations for the positive values.

Figure 5B:
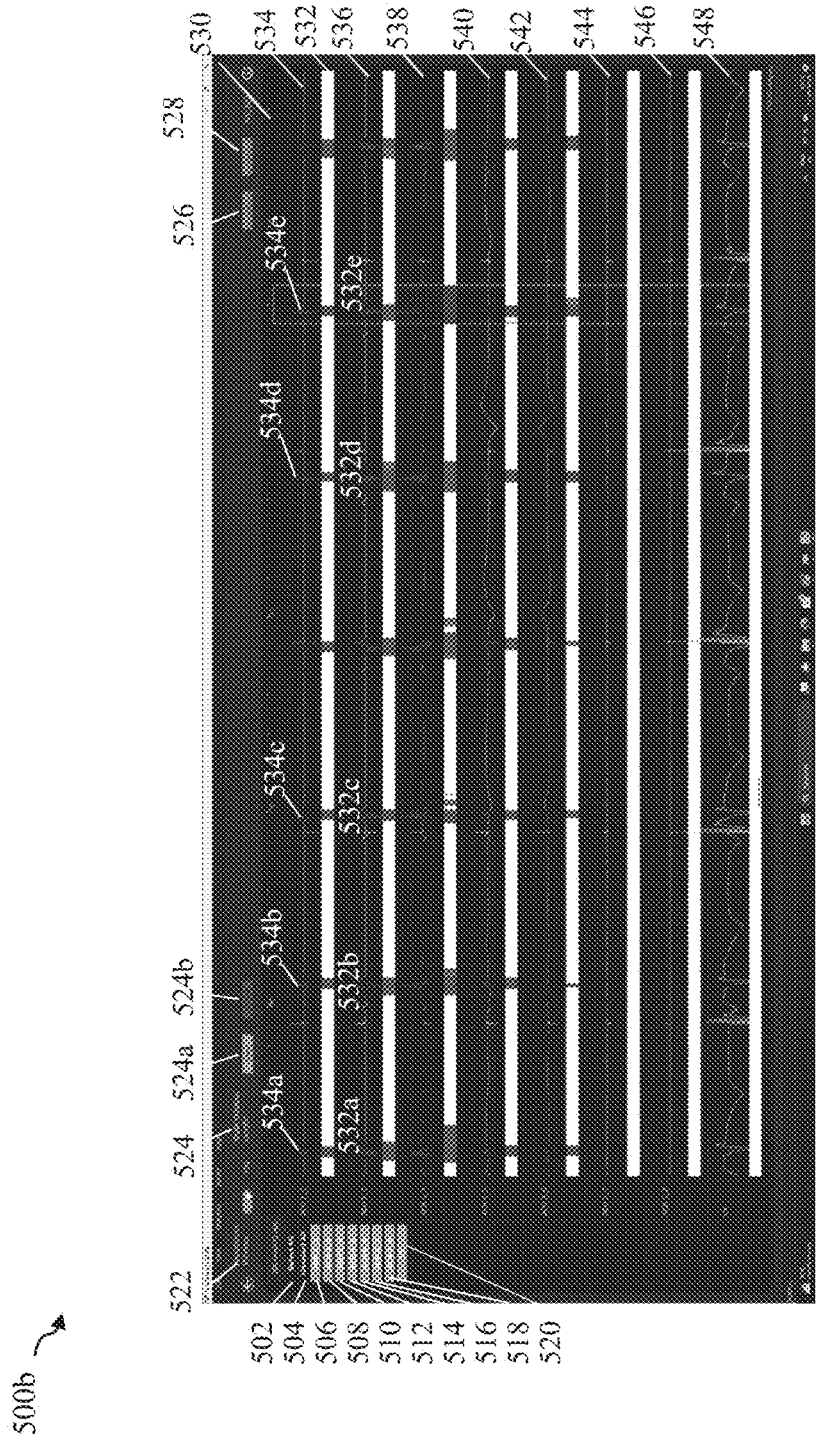
FIG. 5B illustrates a user interface for displaying labeled one or more signals, in accordance with an example embodiment.

Referring now to FIG. 5B, a user interface, 500b, for displaying labeled one or more signals, in accordance with an example embodiment. As shown in FIG. 5B, the annotation window option 522 is enabled to validate the labeled one or more signals. Further, the scale length window option 524 may be configured to specify the size of the annotation window as 50 ms. The annotation window may comprise an annotation segment 532a, an annotation segment 532b, an annotation segment 532c, an annotation segment 532d, and an annotation segment 532e. For example, the annotation segment 532a may be displayed with the light brown color to indicate that a segment of the signal 534 is annotated by the technician. Further, the annotation segment 532b, the annotation segment 532c, the annotation segment 532d may be displayed with the brown color to indicate that a segment of the signal 534 is annotated by the model. Additionally, the annotation segment 532e may be displayed with the yellow color to indicate that a segment of the signal 534 is annotated by the model, but later corrected by the technician. Specifically, the yellow color may indicate a label addition associated with the user validation, for example, the yes label may be added to the at least one respective segment of the labeled one or more signals based on the user validation.

With continued reference to FIG. 5B, in some embodiments, the technician may change the annotation made by the model using the previous annotation window option 526 and the next annotation window 528. For example, to correct the annotation made by the model, to correct the annotation made by the model, the technician may position the annotation window on top of the annotation using the previous annotation window option 526 and the next annotation window option 528, thereafter click on the annotated waveform. As a result, the color of the annotation segment may change accordingly to display that change has been made.

With continued reference to FIG. 5B, in an embodiment, the correction tool may allow the user to correct existing labels. In an example, the model may allow the clinicians to view the predicted labels and annotations. Thereafter, the clinicians may examine the predicted labels to determine whether the model prediction is according to the defined label guidelines or not. If the model predictions are misclassified, then the clinicians may provide user input to the tool to change the labels to the negative class by pressing on a button such as a toggle button on the UI. In an example, a color of the region below the waveform may change from brown to yellow indicating the correction. Further, the model may create a new record in the annotation table with study case id same as the one which links model and case currently opened for viewing on the UI. In such a case, the version v2 may be registered for that may record the values of the pixel_value array filled with 128 to create yellow color for box below waveform as indicator for correction change. In an embodiment, if the clinicians need to undo the corrections made earlier, the clinician may provide a user input using the toggle button on the UI. Thereafter, the new record created for correction will be retracted, and block goes back to being brown in the UI.

Figure 5C:
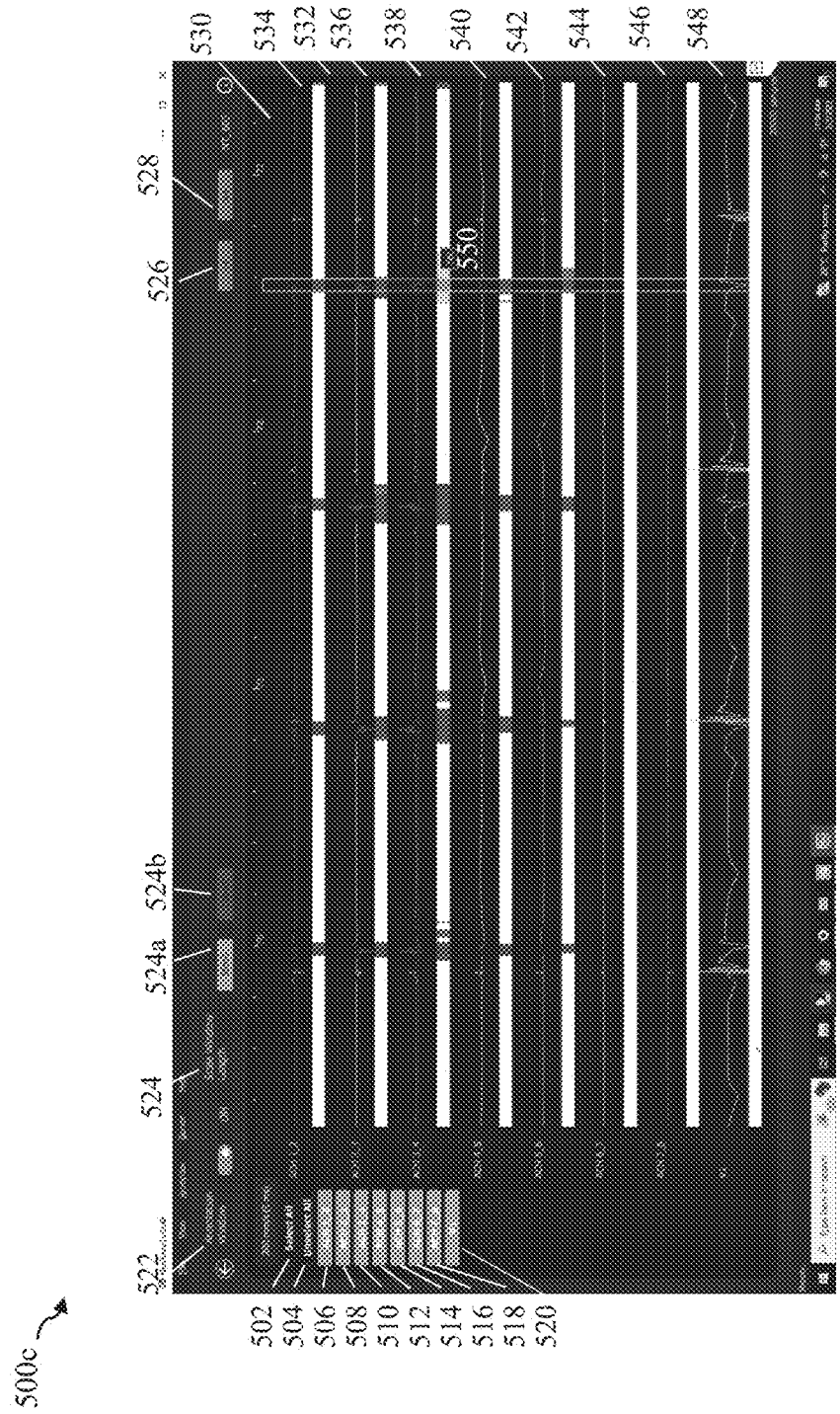
FIG. 5C illustrates a user interface for displaying labeled one or more signals, in accordance with an example embodiment.

Referring now to FIG. 5C, a user interface, 500c, for displaying labeled one or more signals, in accordance with an example embodiment. As shown in FIG. 5B, the annotation window option 522 is enabled to validate the labeled one or more signals. Further, the scale length window option 524 may be configured to specify the size of the annotation window as 50 ms. In an embodiment, the correction tool may allow the user to change the length of the annotations in such a manner, that the label remains unaltered. In an example, the model may allow the clinicians to view the predicted labels and annotations. Thereafter, the clinicians may examine the predicted labels to determine whether a segment of prediction contains features of the signal (such as pulmonary vein potential PVP), or not. If the segment is not the entirety of predicted segment, then clinician may provide user input to change the length of the window. In such a case, the color of the label may be changed indicating a change in label from no to yes for the segment. In an example, a length of a segment 550 between time interval 72 and 73 seconds corresponding to the signal 538 may be changed based on the input from the clinicians.

With continued reference to FIG. 5C, in an example, the clinicians may provide user input on the UI by placing the window over the desired segment such as the segment 550 to be made as positive. Thereafter, press on the toggle button. In an example, a stored record in the database may be updated with study case id of the clinicians and case they are accessing version as V2 and color to light brown on the selected segment by changing the start index and end index with change pixel_values to create the light brown color indicating the window change.

Figure 5D:
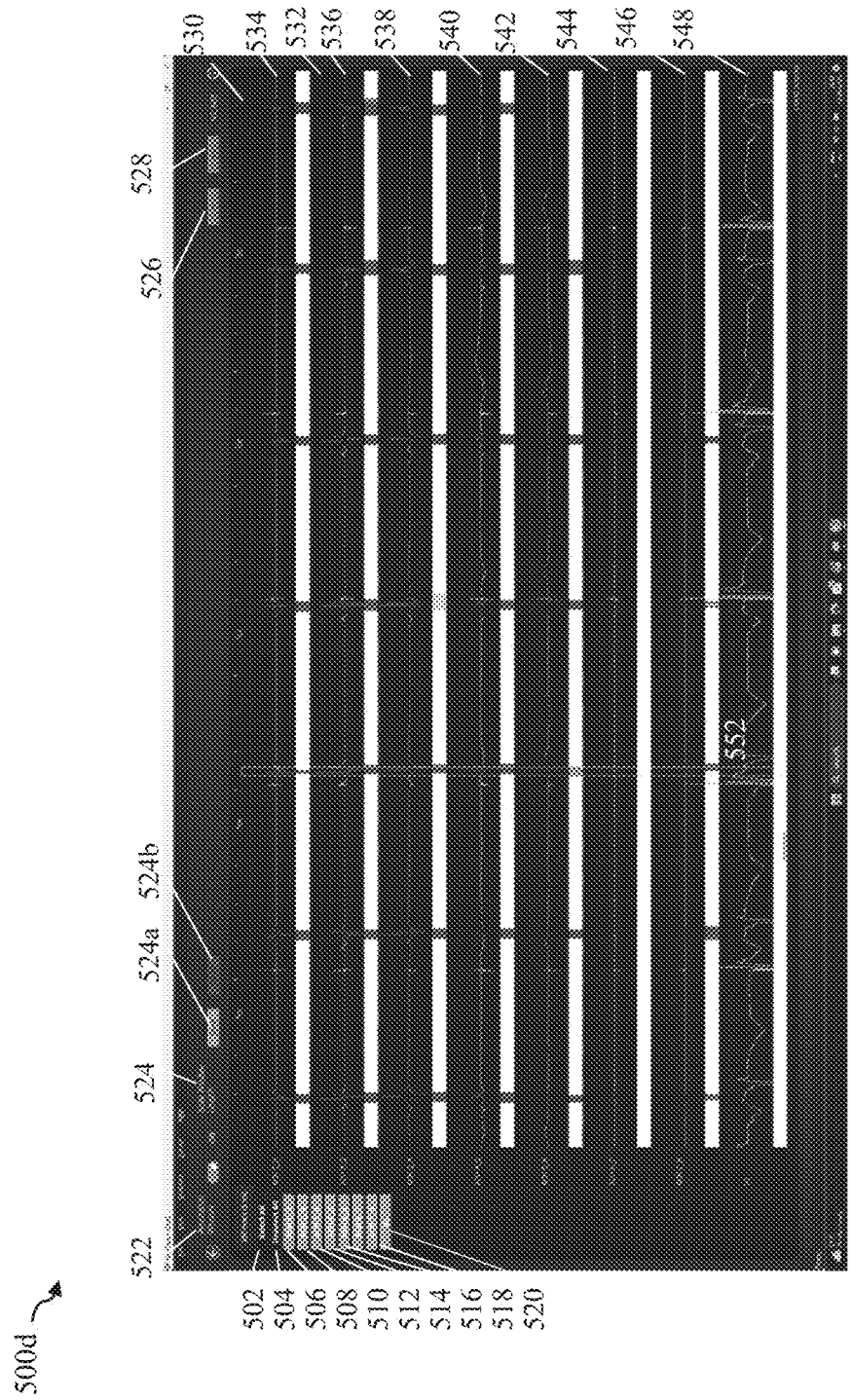
FIG. 5D illustrates a user interface for validating the labeled one or more signals, in accordance with an example embodiment.

Referring now to FIG. 5D, a user interface, 500d, for validating the labeled one or more signals, in accordance with an example embodiment. As shown in FIG. 5B, the annotation window option 522 is enabled to validate the labeled one or more signals. Further, the scale length window option 524 may be configured to specify the size of the annotation window as 50 ms. In an embodiment, the clinician or technician may provide user input to create new annotations. The new annotations may be added for the predictions that the model failed to predict. As shown in FIG. 5D, the user interface may receive user input to insert a new annotation 550 for signal 544, which may have been missed by the model. In an example, the inserted annotation may be represented by light brown color. Further, the white color may change to light brown. In such a case, a light brown color of the respective segment of the annotation may indicate the corrective factor corresponding to the at least one respective segment of the labeled one or more signals.

With continued reference to FIG. 5D, in a non-limiting example, if the clinician determines, while viewing the UI, that a region has went undetected. In such a case, the clinician may annotate the region using one given length, thereby adding a new annotation 552 between time interval 56- and 57-seconds corresponding to the signal 546. Further, the record in the database may be updated for a positive label, start and end index may be selected with pixel value of 1's referring to the light brown color in order to indicate the new annotation and version as v2.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 6:
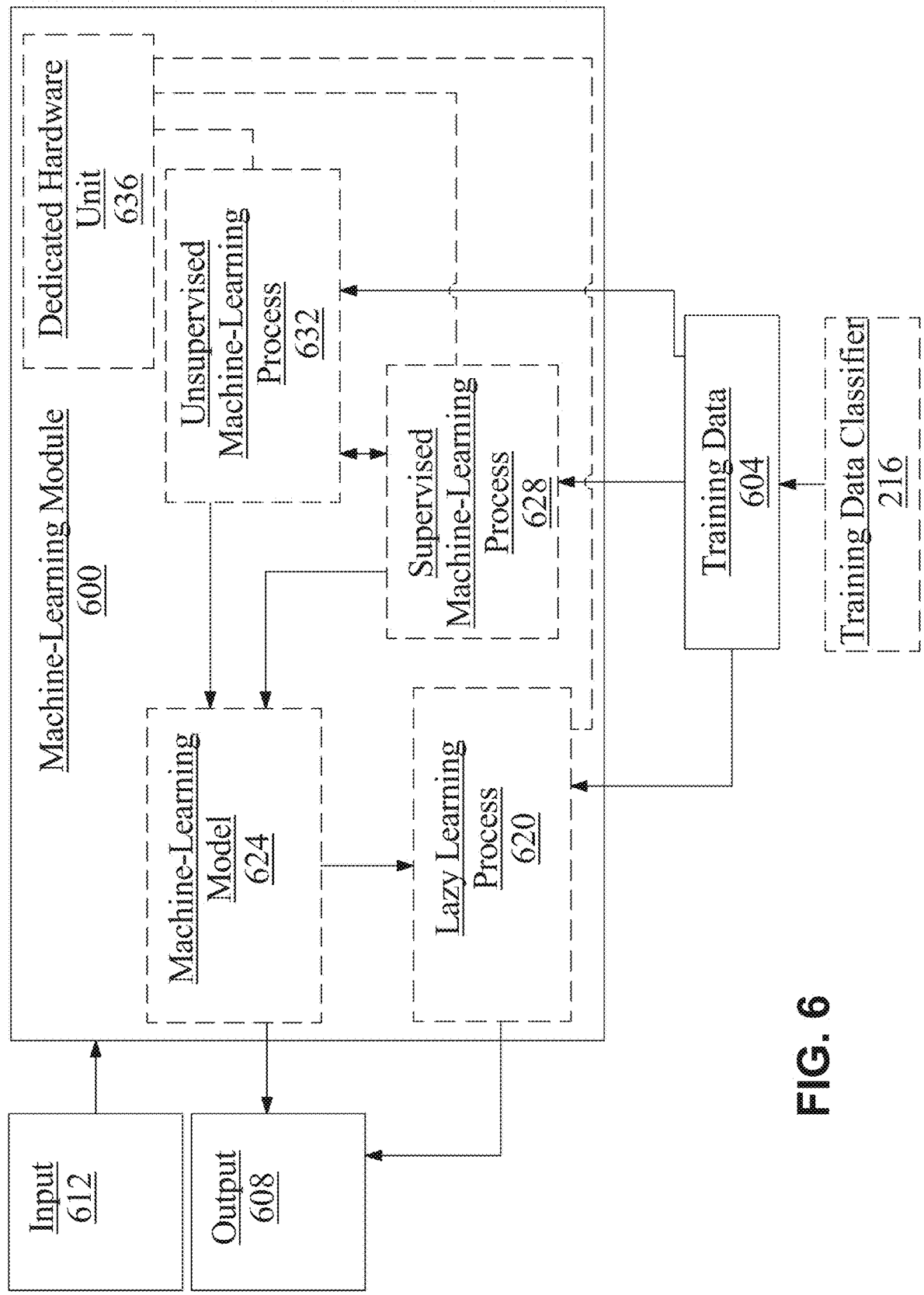
FIG. 6 is a block diagram of an exemplary machine-learning process.

Referring now to FIG. 6 an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative inputs may include processed data and outputs may include the plurality of labeled data.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to categorize the signal segment by their cardiac annotations.

Still referring to FIG. 6, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 6, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 6, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 6, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 6, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 6, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include processed data as described above as inputs, plurality of labeled data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 632 may not require a response variable; unsupervised processes 632 may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 636. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 636 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 636 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 636 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
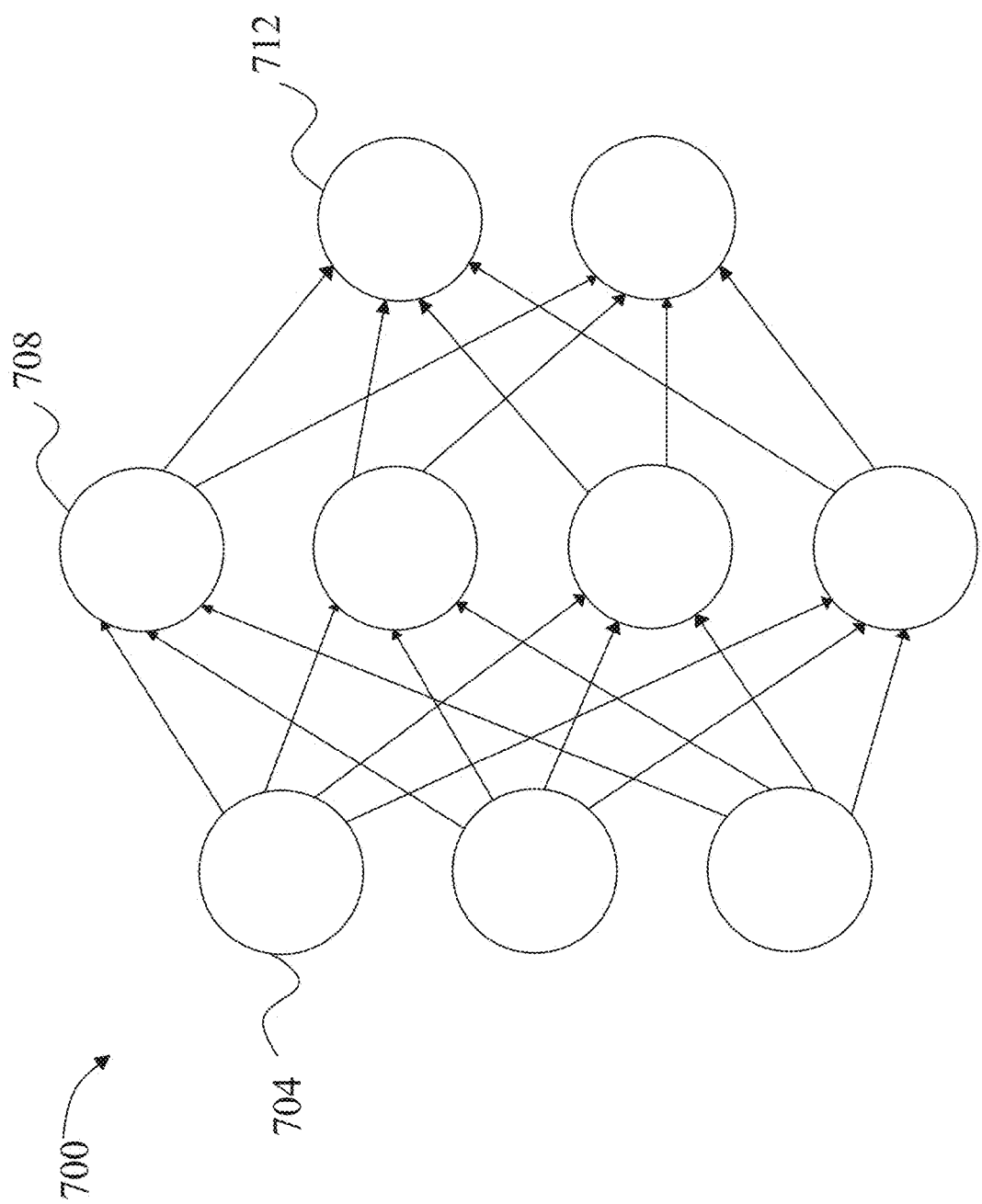
FIG. 7 is a diagram of an exemplary embodiment of a neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further nonlimiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
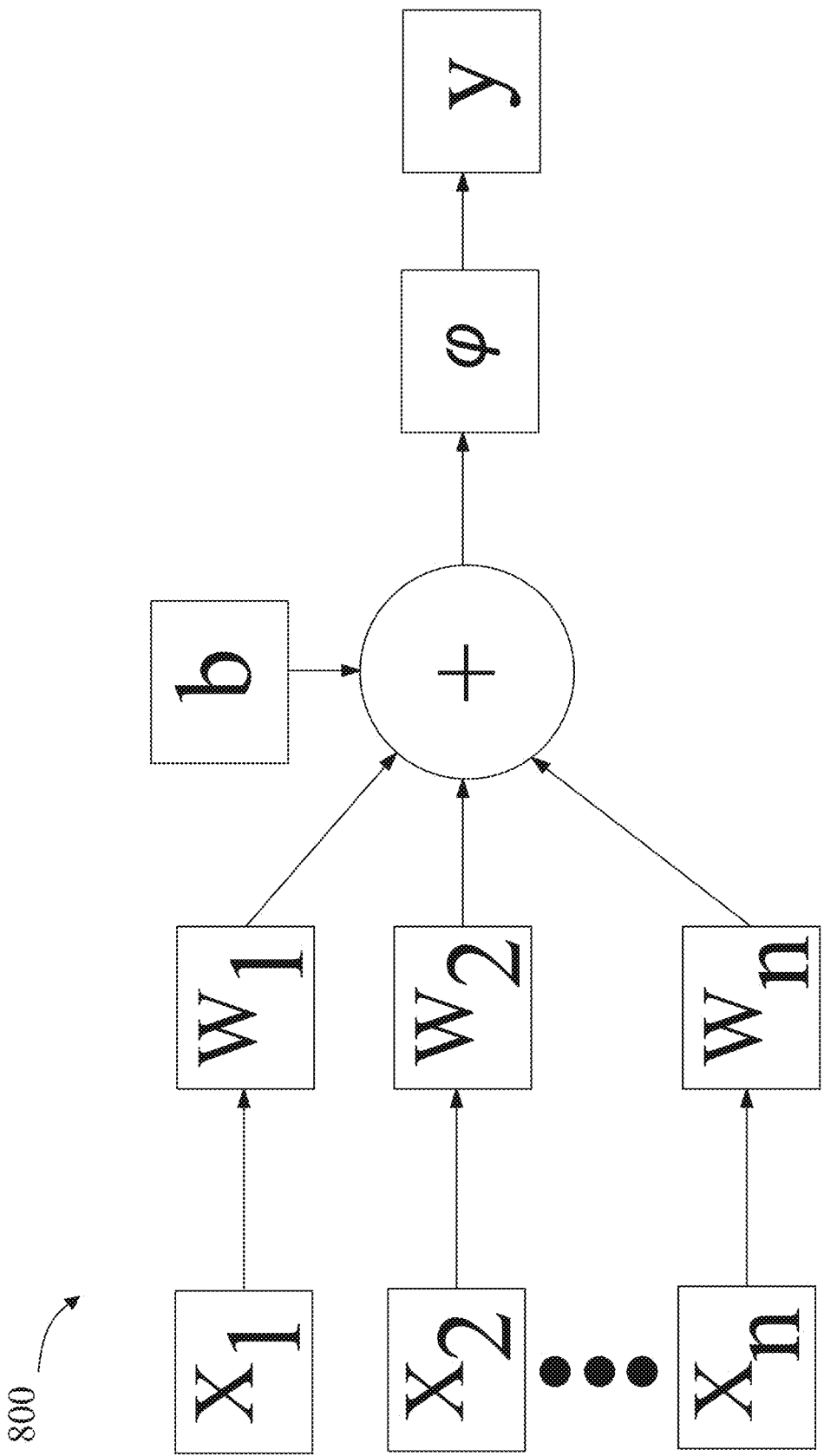
FIG. 8 is a diagram of an exemplary embodiment of a node of a neural network.

Referring now to FIG. 8, an exemplary embodiment of a node 800 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max(0, x), a "leaky" and/or "parametric" rectified linear unit function such as ƒ(x)=max(ax, x) for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as f(x)=a(1+tanh($\sqrt{2/\pi}$(x+bx^r))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
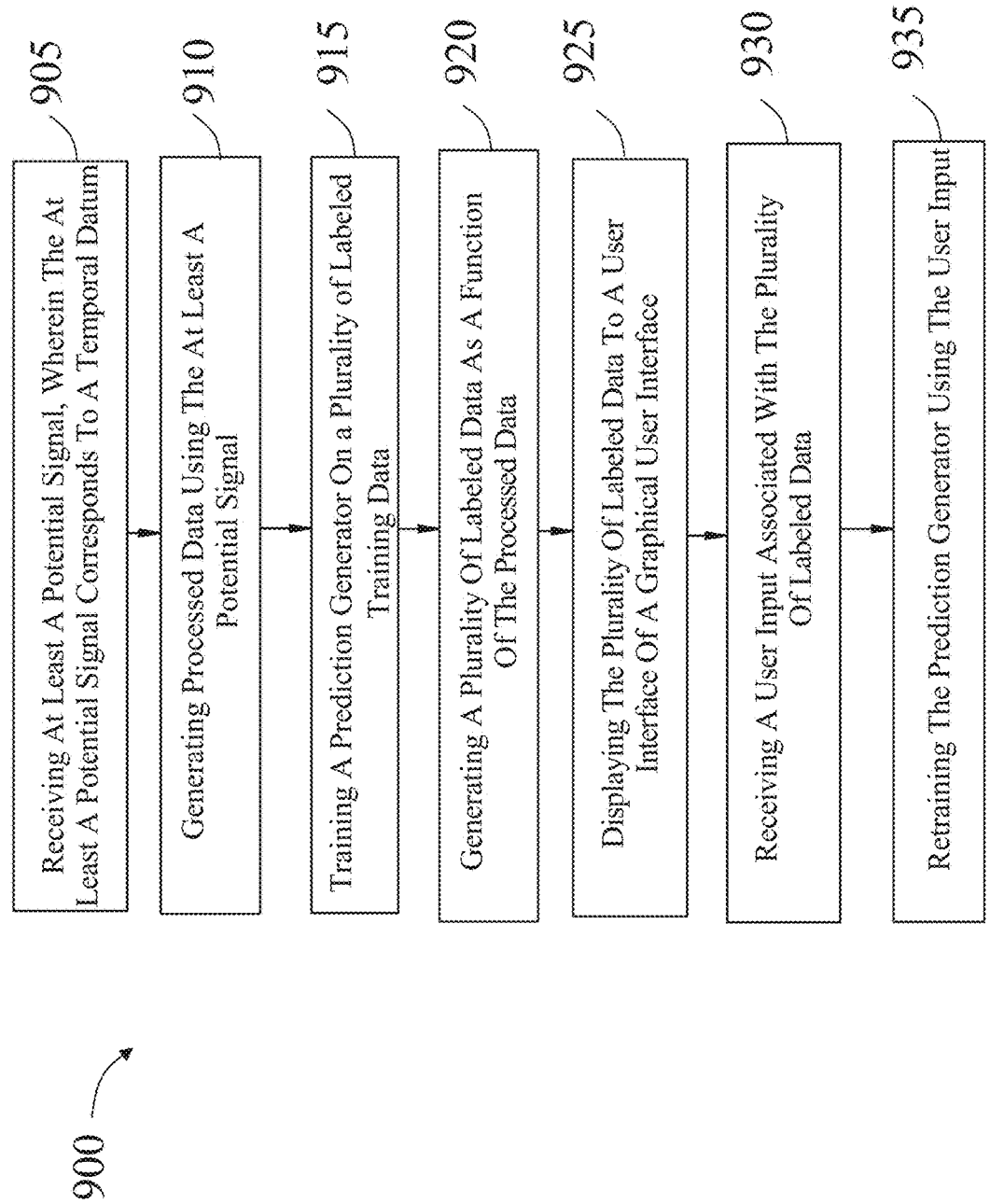
FIG. 9 is a block diagram of an exemplary method for validating, using user input, labeled data generated by a prediction generator.

Referring now to FIG. 9, a flow diagram of an exemplary method 900 for validating, using user input, labeled data generated by a prediction generator is illustrated. At step 905, method 900 includes receiving, using the at least a processor, at least a potential signal, wherein the at least a potential signal corresponds to temporal data. This may be implemented as described and with reference to FIGS. 1-8.

Still referring to FIG. 9, at step 910, method 900 includes generating, using the at least a processor, processed data using the at least a potential signal. This may be implemented as described and with reference to FIGS. 1-8.

Still referring to FIG. 9, at step 915, method 900 includes training a prediction generator on a plurality of labeled training data, wherein the plurality of labeled training data comprises the archive data associated with at least an annotation. This may be implemented as described and with reference to FIGS. 1-8.

Still referring to FIG. 9, at step 920, method 900 generating, using the prediction generator, a plurality of labeled data as a function of the processed data. This may be implemented as described and with reference to FIGS. 1-8.

Still referring to FIG. 9, at step 925, method 900 includes displaying, using a downstream device, the plurality of labeled data to a user interface of a graphical user interface. This may be implemented as described and with reference to FIGS. 1-8.

Still referring to FIG. 9, at step 930, method 900 includes receiving, using the at least a processor, a user input associated with the plurality of labeled data. This may be implemented as described and with reference to FIGS. 1-8.

Still referring to FIG. 9, at step 935, method 900 includes retraining, using the at least a processor, the prediction generator using the user input. This may be implemented as described and with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
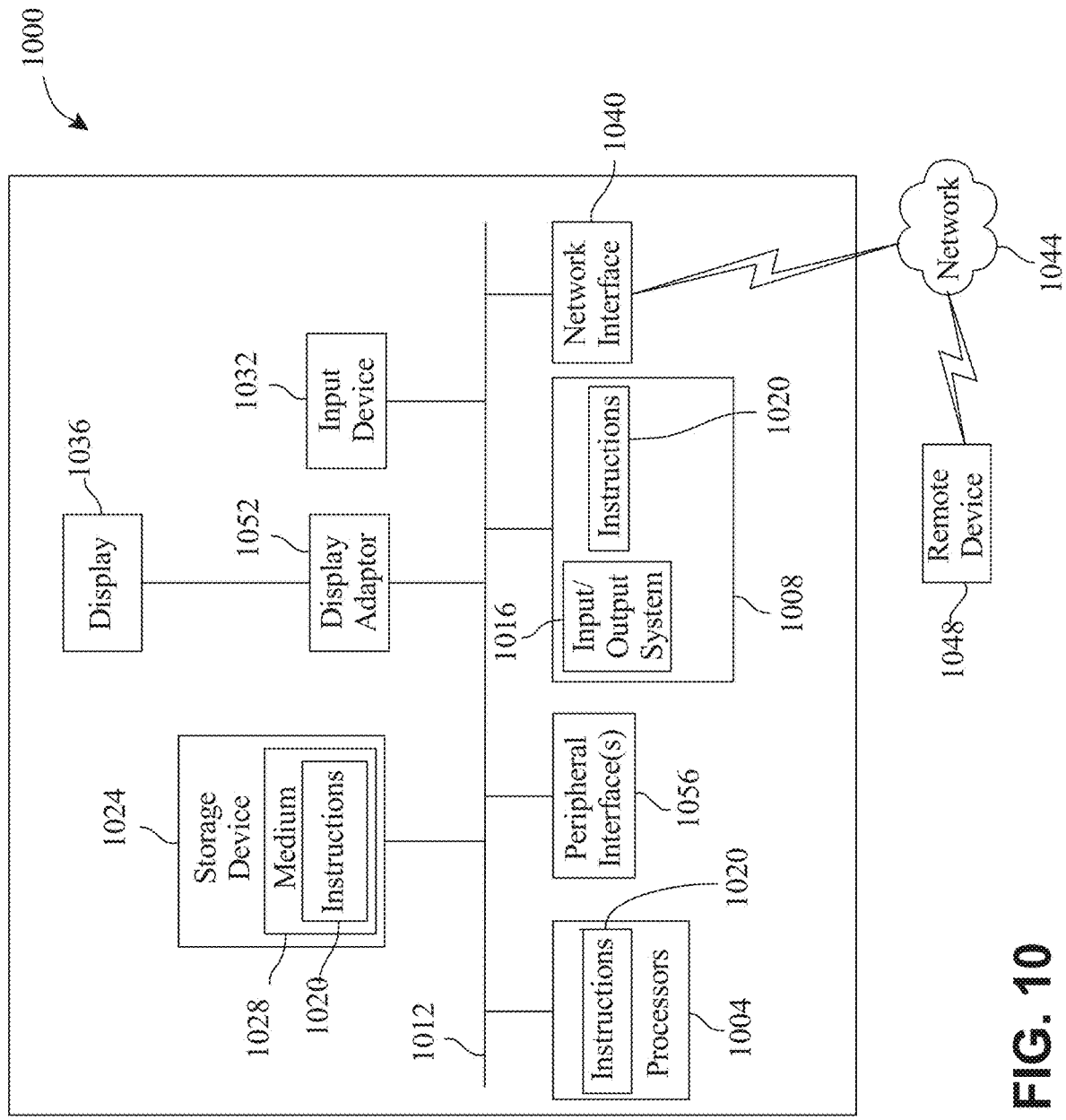
FIG. 10 is a block diagram of a computing system that can be used to implement any one or more of the methodologies disclosed herein and any one or more portions thereof.

FIG. 10 shows a diagrammatic representation of one embodiment of computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for validating, using user input, labeled data generated by a prediction generator, wherein the apparatus comprises:
   at least a catheter configured for intracardiac use, the at least a catheter comprising at least a transducer configured to detect a cardiac phenomenon and output at least a potential signal, as a function of the cardiac phenomenon;
   at least a localization system configured to detect at least a position signal as a function of a location of the at least a catheter; and
   at least a computing device, wherein the computing device comprises:
      a memory; and
      at least a processor communicatively connected to the memory, wherein the memory contains instructions configuring the at least a processor to:
         receive the at least a potential signal, wherein the at least a potential signal corresponds to temporal data;
         generate, using the at least a processor, processed data using the at least a potential signal;
         train a prediction generator on a plurality of labeled training data, wherein the plurality of labeled training data comprises archive data associated with at least an annotation;
         generate, using the prediction generator, a plurality of labeled data as a function of the processed data;
         display, using a downstream device, the plurality of labeled data to a user interface of a graphical user interface;
         receive a user input associated with the plurality of labeled data, wherein the user input comprises one or more of a correction datum and a confirmation datum and wherein the correction datum comprises one or more of a signal segment correction and a segment annotation correction;
         retrain the prediction generator using the user input.

2. The apparatus of claim 1, wherein the at least a potential signal comprises electrocardiogram data.

3. The apparatus of claim 1, wherein generating the processed data comprises:
   normalizing the potential signal into a consistent data format;
   generating a combined potential signal by combining a first potential signal with a second potential signal of the at least a potential signal, wherein the first potential signal is a duplicate of the second potential signal; and
   generating a scaled potential signal of the at least a potential signal.

4. The apparatus of claim 1, wherein the prediction generator comprises a semi-supervised machine learning model, wherein the semi-supervised machine learning model comprises a neural network.

5. The apparatus of claim 1, wherein the signal segment correction is configured to correct the signal segment generated by the prediction generator.

6. The apparatus of claim 1, wherein the segment annotation correction is configured to correct the segment annotation generated by the prediction generator.

7. The apparatus of claim 1, wherein the signal segment correction and the segment annotation correction are stored in a database.

8. The apparatus of claim 1, wherein the plurality of labeled training data comprises at least a signal segment associated with at least a segment annotation.

9. A method for validating, using user input, labeled data generated by a prediction generator, wherein the method comprises:

using, at least a catheter configured for intracardiac use, the at least a catheter comprising at least a transducer configured to detect a cardiac phenomenon and output at least a potential signal, as a function of the cardiac phenomenon and at least a localization system configured to detect at least a position signal as a function of a location of the at least a catheter;

receiving, using the at least a processor, at least a potential signal, wherein the at least a potential signal corresponds to temporal data;

generating, using the at least a processor, processed data using the at least a potential signal;

training a prediction generator on a plurality of labeled training data, wherein the plurality of labeled training data comprises the processed data associated with at least an annotation;

generating, using the prediction generator, a plurality of labeled data as a function of dynamic data;

displaying, using a downstream device, the plurality of labeled data to a user interface of a graphical user interface;

receiving, using the at least a processor, a user input associated with the plurality of labeled data, wherein the user input comprises one or more of a correction datum and a confirmation datum and wherein the correction datum comprises one or more of a signal segment correction and a segment annotation correction;

retraining, using the at least a processor, the prediction generator using the user input.

10. The method of claim 9, wherein the at least a potential signal comprises electrocardiogram data.

11. The method of claim 9, wherein generating the processed data comprises:

normalizing the potential signal into a consistent data format;

generating a combined potential signal by combining a first potential signal with a second potential signal of the at least a potential signal, wherein the first potential signal is a duplicate of the second potential signal; and generating a scaled potential signal of the at least a potential signal.

12. The method of claim 9, wherein the prediction generator comprises a semi-supervised machine learning model, wherein the semi-supervised machine learning model comprises a neural network.

13. The method of claim 11, wherein the signal segment correction is configured to correct the signal segment generated by the prediction generator.

14. The method of claim 11, wherein the segment annotation correction is configured to correct the segment annotation generated by the prediction generator.

15. The method of claim 9, wherein the signal segment correction and the segment annotation correction are stored in a database.

16. The method of claim 9, wherein the plurality of labeled training data comprises at least a signal segment associated with at least a segment annotation.

* * * * *